United States Patent [19]
Milkovic

[11] 3,875,509
[45] Apr. 1, 1975

[54] ELECTRONIC METERING OF ACTIVE ELECTRICAL ENERGY

[75] Inventor: Miran Milkovic, Scotia, N.Y.

[73] Assignee: General Electric Company

[22] Filed: May 17, 1973

[21] Appl. No.: 361,030

[52] U.S. Cl. ............................................. 324/142
[51] Int. Cl. ...................... G01r 21/00, G01r 11/32
[58] Field of Search ............................ 324/142, 107

[56] References Cited
UNITED STATES PATENTS
3,343,084  9/1967  Gambale et al. .................... 324/142
3,718,860  2/1973  Kwast et al. ........................ 324/142

OTHER PUBLICATIONS
Evans, Elect. Rev., 18 Sept. 1970, pp. 403–404.

*Primary Examiner*—Stanley T. Krawczewicz
*Attorney, Agent, or Firm*—Cushman, Darby & Cushman

[57] ABSTRACT

Metering kWh in an electrical system involves producing analog signals from line currents and voltages. Pairs of analog signals, representing current and voltage variables, are processed in four-quadrant time-division multiplier networks which, in effect, multiply said variables and produce series of width-and-amplitude modulated pulse signals, each representing instantaneous partial power. Pulse signals from the different multiplier networks are summed to provide another series of pulse signals, each representing instantaneous total power. The series of pulse signals representing intantaneous total power are processed through a low-pass filter which produces another signal representative of average total power in the system. Subsequently, the signal representing average total power is processed in an analog to pulse-rate converter which produces a series of output pulse signals, each representing a constant, or quantized, amount of electrical energy. A stepping switch and register perform conventional accumulation, storage and display functions in response to said series of output pulse signals delivered thereto.

40 Claims, 36 Drawing Figures

I, V are RMS VALUES

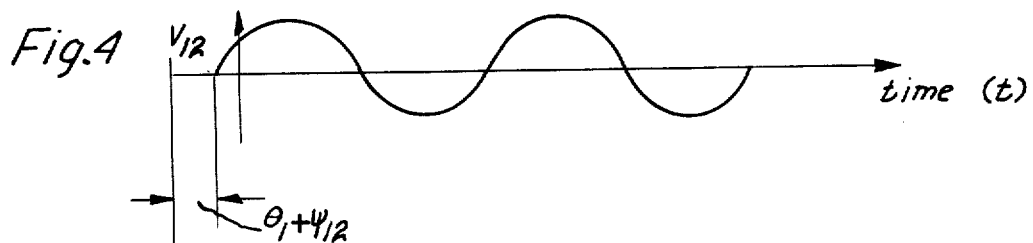
Fig.4
Fig.5
Fig.6
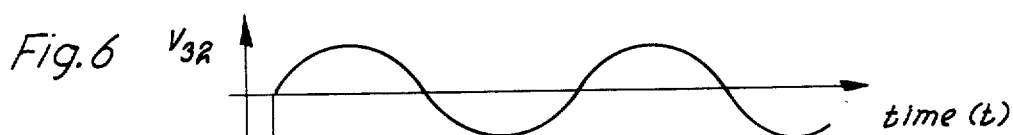
Fig.7
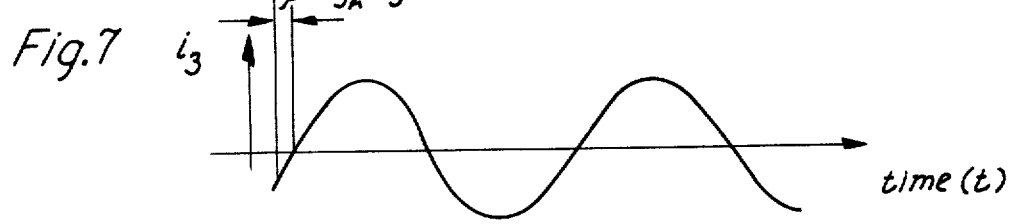
Fig.8
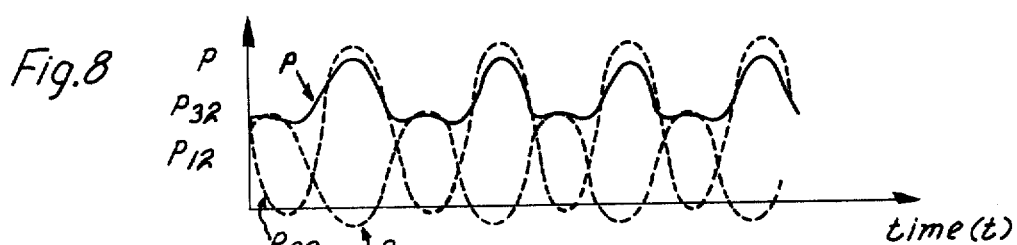
Fig.9
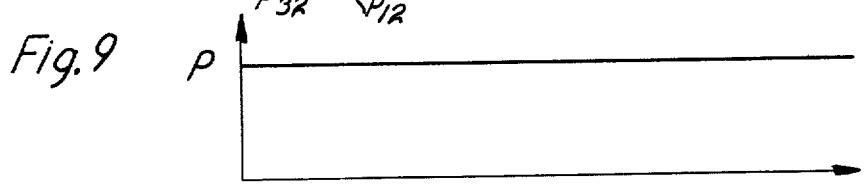
Fig.10
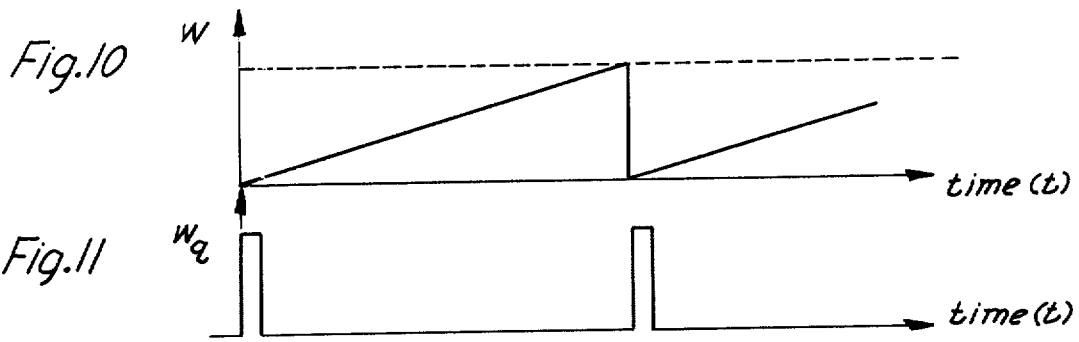
Fig.11

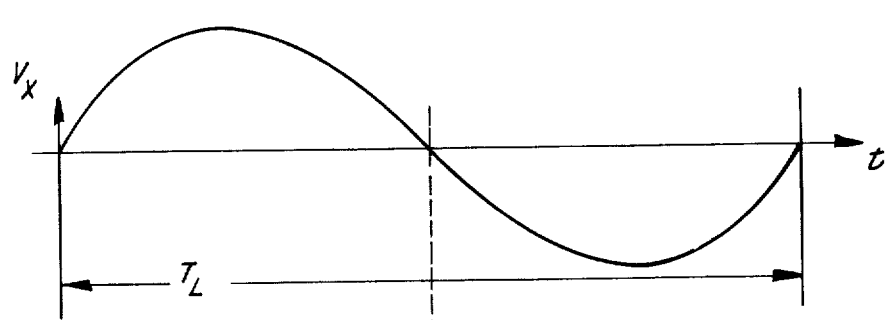
Fig.15
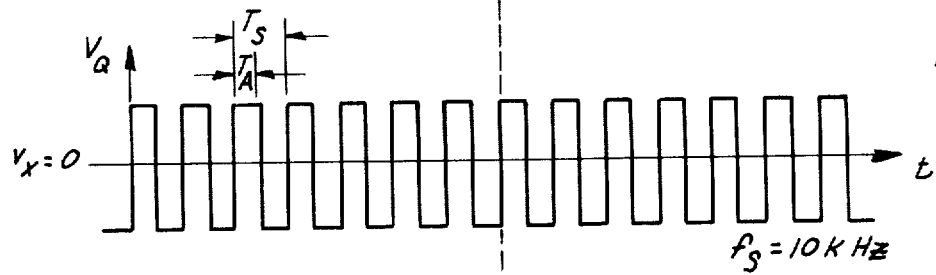
Fig.16
Fig.17
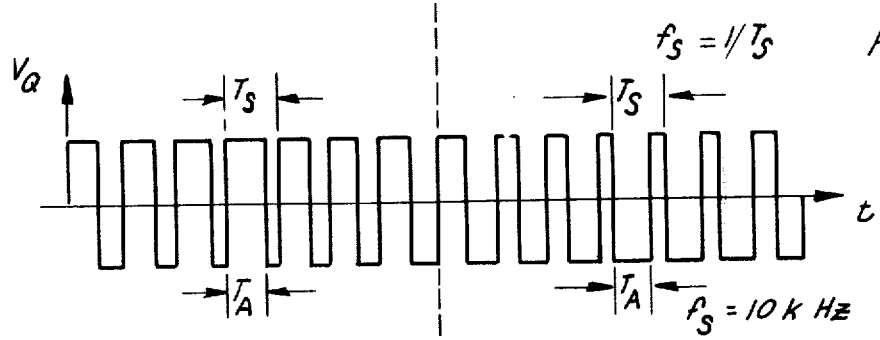
Fig.18
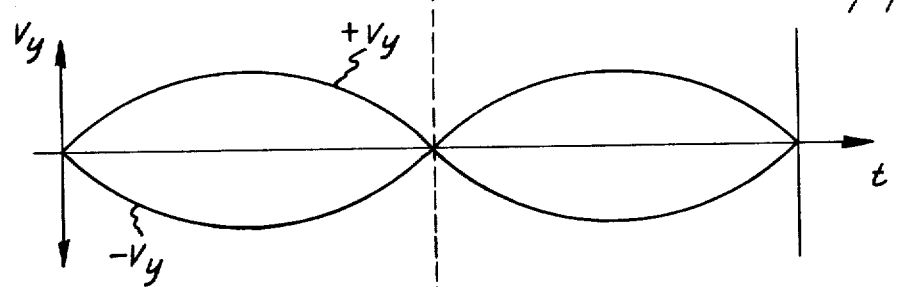
Fig.19
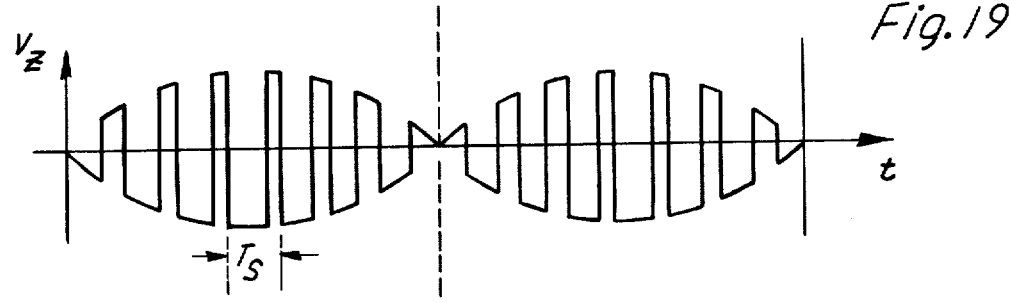

A/PR CONVERTER

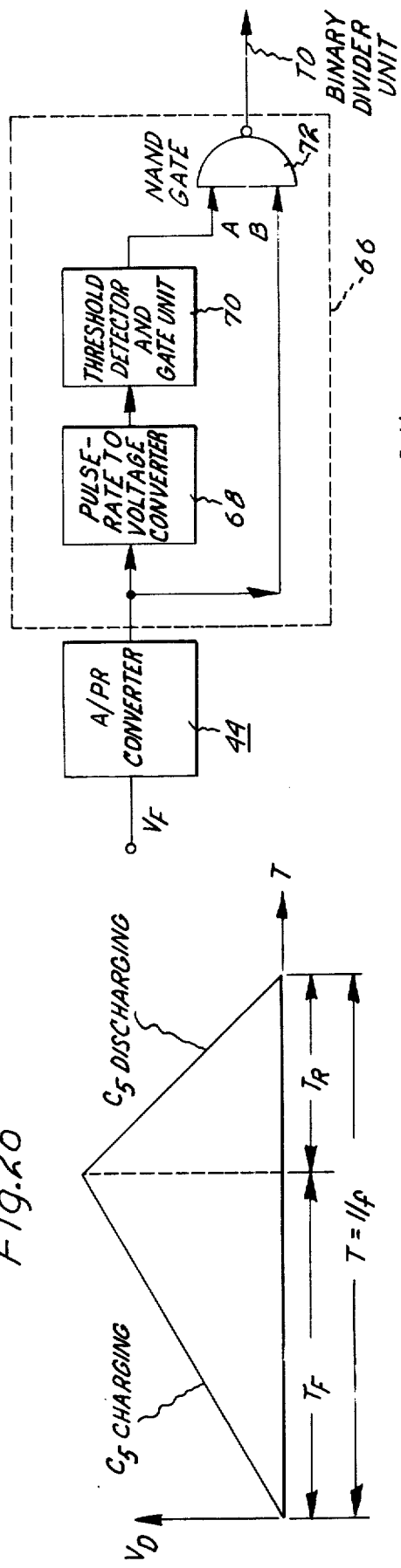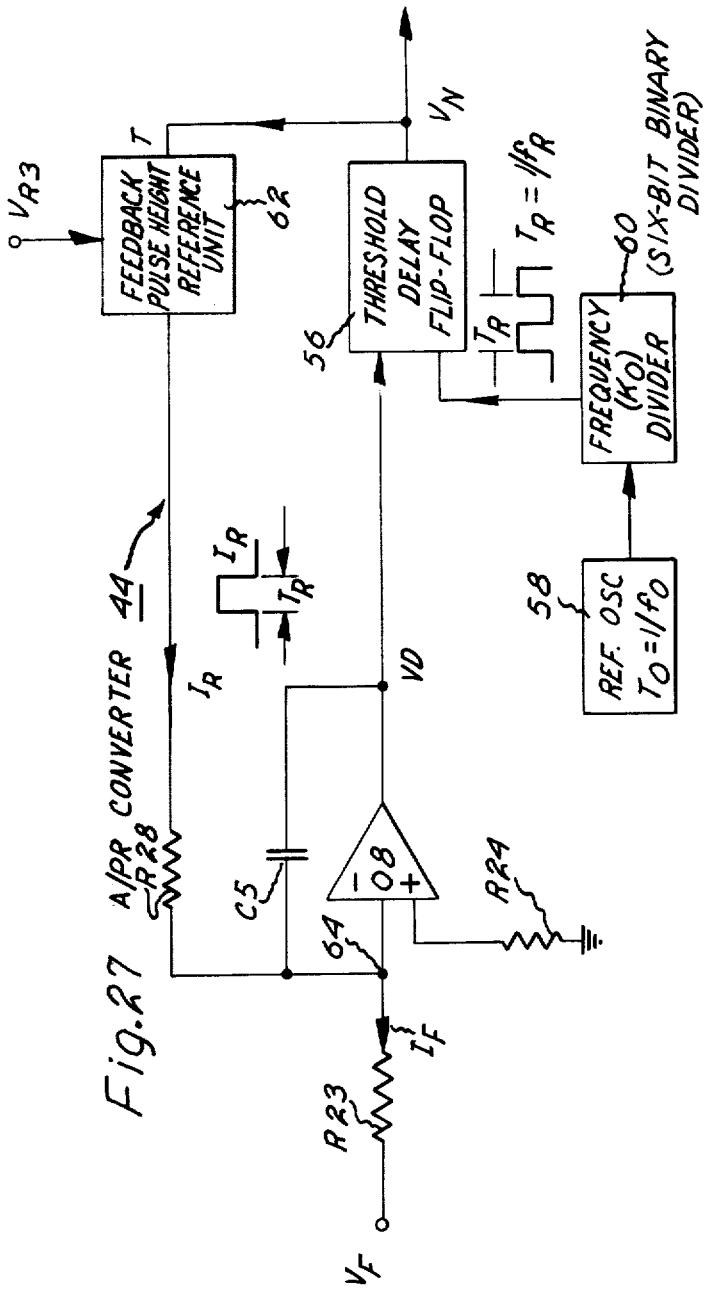

ELECTRONIC METERING OF ACTIVE ELECTRICAL ENERGY

CROSS-REFERENCES TO RELATED PATENT APPLICATIONS

Employed to advantage in connection with the invention hereinafter disclosed are some of the principles disclosed in the following U.S. Pat. applications earlier-filed in behalf of Miran Milkovic, the same inventor in whose behalf this patent application is filed: Ser. No. 365,429, filed May 31, 1973 and titled CURRENT TRANSFORMER WITH ACTIVE LOAD TERMINATION said application Ser. No. 365,429 being a continuation of the now-abandoned application,; and, Ser. No. 346,412, filed Mar. 30, 1973 and titled CURRENT TRANSFORMER WITH ACTIVE LOAD TERMINATION FOR PROVIDING, INTER ALIA, PHASE ANGLE ALTERATION.

The entire right, title and interest in and to the inventions described in the aforesaid patent applications, as well as in and to the aforementioned patent applications, and the entire right, title and interest in and to the invention herein disclosed, as well as in and to the patent application of which this specification is a part, are assigned to the same assignee.

SUMMARY OF THE INVENTION

The subject invention pertains, in general, to a method and apparatus for metering active (average) electrical energy (e.g., kWh) in electrical systems, and, in particular to converting analog signals representing measured currents and voltages to a series of output signals wherein the signal repetition rate, or frequency, represents average system power and each output signal represents a constant amount of system energy.

Electrical energy (kilowatt-hours, or kWh) has been, and continues to be, metered with the ubiquitous rotating disc type of meter which is disclosed in, among other sources, the "Electrical Metermen's Handbook," Chapter 7, Seventh Edition, published 1965 by Edison Electric Institute. The invention hereinafter disclosed represents a substantial departure from the methodology and apparatus exemplified by the rotating disc type of meter.

In addition, those who are familiar with the instrumentation and metering arts, respecting electrical power and energy, know of proposed systems including apparatus employing electronic and solid state devices for measuring power and energy. In such apparatus the electronic and solid state devices replace the conventional rotating disc. For example, the following patents disclose systems including electronic and solid state devices for measuring electrical energy: Canadian Pat. No. 801,200; U.S. Pat. No. 3,602,843; and Swiss Pat. No. 472,677. The invention hereinafter disclosed represents a departure from the methodology and apparatus disclosed in the aforesaid patents.

One object of the invention is the provision of a method of, and apparatus for, metering active (average) electrical energy in electrical systems.

Another object of the invention is the provision of a meter for metering active electrical energy; said meter comprising solid state circuitry which may be fabricated in the form of monolithic integrated structures.

Another object of the invention is the provision of a method of, and apparatus for, metering active electrical energy; said method and apparatus employing analog-to-modulated pulse conversions as well as analog-to-pulse rate conversions in computing active electrical energy.

In accordance with the invention, active electrical energy metering in, for example, a three-phase, three-line, $f_L$ hertz system is accomplished by producing analog signals representing different line currents and line voltages. If the methodology of blondel's theorem is employed, two different line currents and two different line voltages may be represented by four different analog signals produced from measurements being made of said currents and voltages. Pairs of said analog signals, representing a current and a voltage, are, in effect, sampled and multiplied to produce from each pair a series of signals at a signal repetition rate $f_S$, where $f_S > f_L$ so that $k = f_S/f_L = T_L/T_S$ and in the time period $T_L$ there are first through kth consecutive signals in said series with each signal representing instantaneous partial power. Corresponding first through kth signals of the same ordinal number in the different series are summed to produce another series of first through kth consecutive signals, each representing instantaneous total power in the system. Subsequently, the series of signals representing instantaneous total system power is integrated and averaged over a relatively long time period $T > T_L = 1/f_L$ to produce a relatively steady state signal representative of average total system power. Thereafter, the aforesaid steady state signal is converted to another series of equally quantized signals wherein said series has a varying repetition rate representative of average total power and each quantized signal represents a constant amount of electrical energy.

Although the invention is hereinafter disclosed as applicable for metering kWh in a three-phase, three-wire $f_L$ hertz (e.g., 60 hz.) electrical system having a balanced delta-connected load coupled thereto, it is to be understood that such disclosure is made for the purpose of giving one example of the method, and metering apparatus, provided by the invention for kWh metering. The invention may be employed, as well, for metering active electrical energy in electrical systems such as the following: polyphase systems, generally, i.e., systems having two, three, or more phases; three-phase systems having more than three wires or lines; combinations of polyphase systems; systems having electrical loads which are balanced or unbalanced; systems having electrical loads which may include reactive impedances; systems having sources, as well as loads, may be delta-connected, mesh-connected, wye-connected, or star-connected; systems having a system frequency $f_L$ which may be 60 hertz as well as less than, or more than, 60 hertz; systems wherein the various currents and voltages selected for measurement, initially, may be selected according to Blondel's theorem, or not. Furthermore, according to the invention, kWh metering may be performed as a real-time operation, or it may be performed as an off-line operation.

Other objects, as well as the various features of the invention, appear hereinafter wherein a method of, as well as apparatus for, metering active electrical energy is disclosed for the purpose of illustrating the invention; said disclosure including accompanying drawing figures.

DRAWINGS

FIG. 4 is a sinusoidal waveform of one line-to-line voltage $v_{12}$ showing the instantaneous voltage amplitude thereof, as a function of time $t$, between two lines, lines 1 and 2, of the three-phase, $f_L$ hertz, three-wire, electrical system illustrated at FIG. 1.

FIG. 5 is a sinusoidal waveform of one line current $i_1$ showing the instantaneous current amplitude thereof as a function of time; the current $i_1$ being the current in one of the lines, line 1, of the a.c. electrical system of FIG. 1.

FIG. 6 is a sinusoidal waveform of another line-to-line voltage $v_{32}$ showing the instantaneous voltage amplitude thereof as a function of time between lines 3 and 2 of the electrical system illustrated at FIG. 1.

FIG. 7 is a sinusoidal waveform of another line current $i_3$ showing the instantaneous current amplitude thereof as a function of time; the current $i_3$ being the current in one of the lines, line 3, of the electrical system of FIG. 1.

FIG. 8 is a graphical representation showing instantaneous power p in the whole system as a function of time.

FIG. 9 is another graphical representation showing active average power P, in the whole system, as a function of time $t$; i.e., $$P = \frac{1}{T} \int p\, dt.$$

FIG. 10 is another graphical representation showing a sawtooth waveform representing energy $$W = \int P\, dt,$$

as a function of time $t$.

Figure 1:
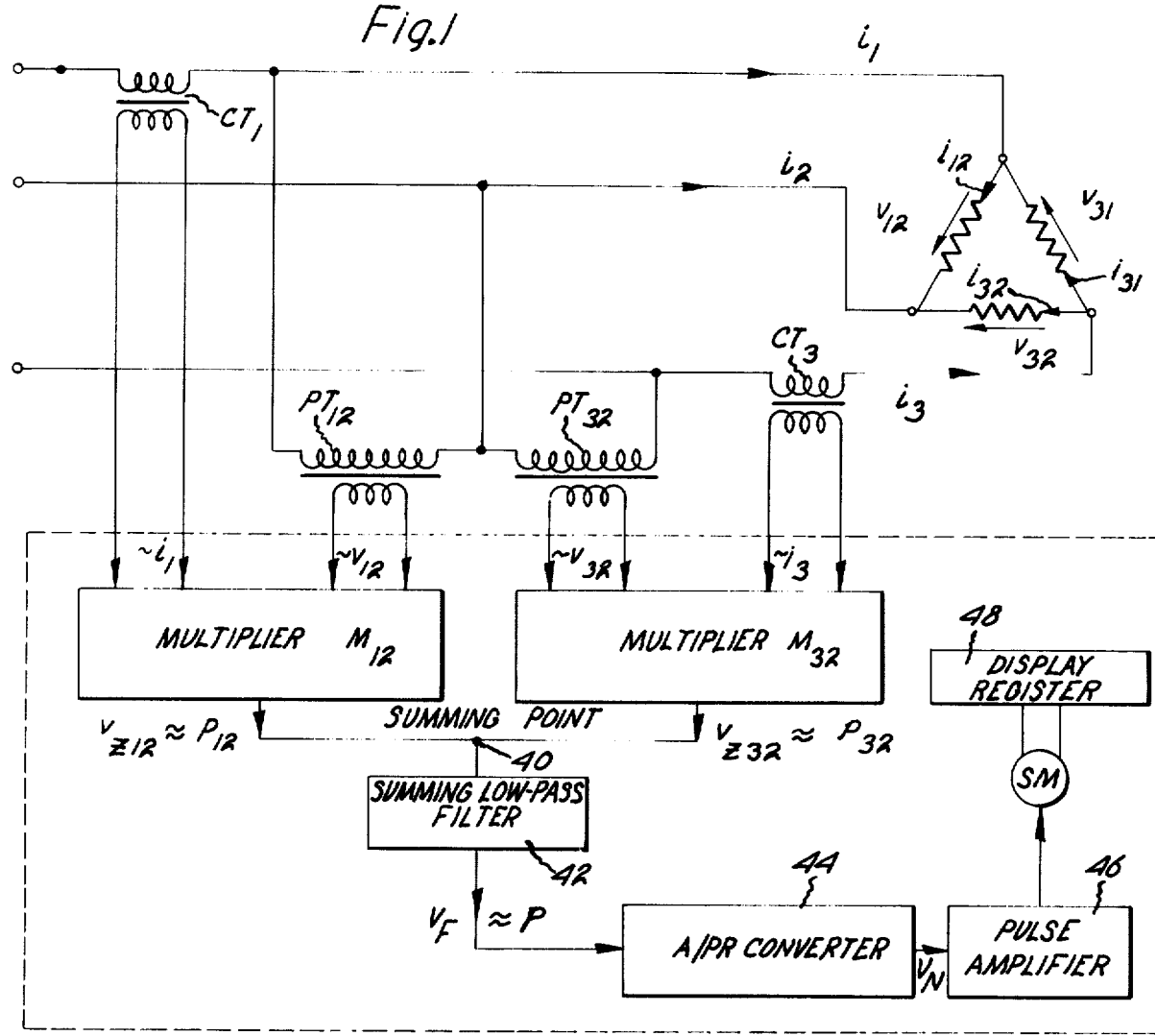
FIG. 1 is a block diagram and schematic illustration showing, inter alia, various components comprising apparatus for metering active electrical energy in a three-phase, three-wire, 60 hertz electrical system to which a three-phase, delta-connected electrical load is coupled.

FIG. 11 is another graphical representation showing quantized output pulses as a function of time, each output pulse representing a quantized, or constant amount of, energy W, said quantized output pulses being delivered as output signals from an analog to pulse-rate (A/PR) converter employed in the system shown at FIG. 1.

Figure 12:
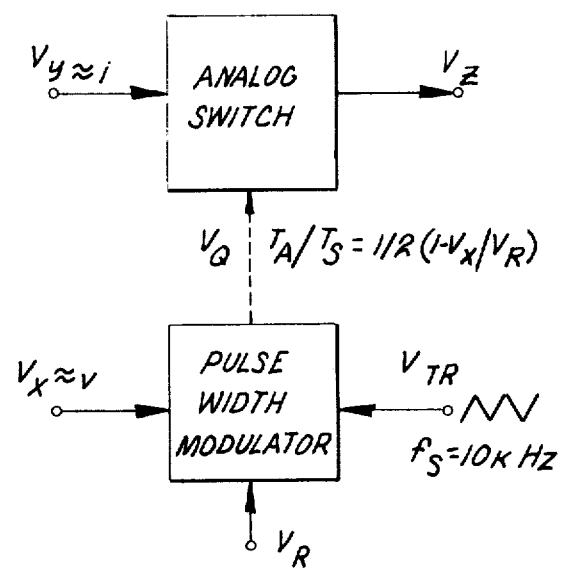

FIG. 12 is a block diagram for illustrating the basic operating principle of the four-quadrant timedivision PWA multiplier network employed to convert pairs of signed analog signals to a series of width-and-amplitude modulated pulses, each representing instantaneous power.

Figure 13:
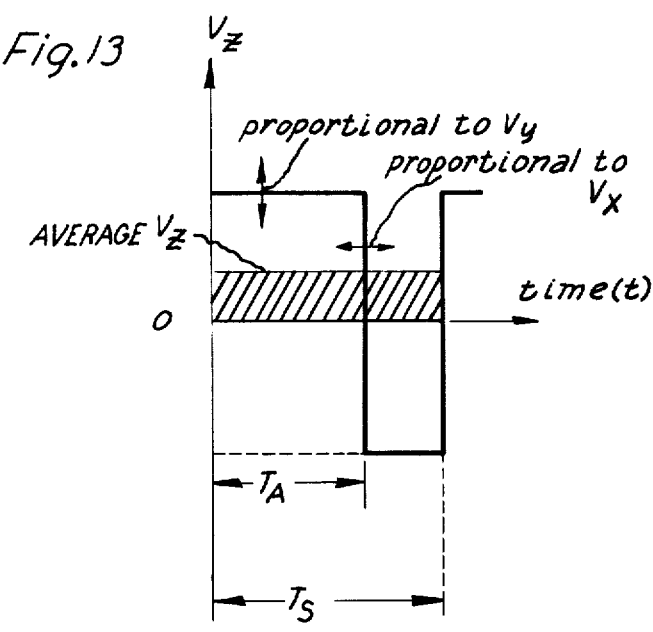

FIG. 13 is a graphical representation showing a waveform of one output pulse signal developed by a PWA multiplier; e.g., the PWA multiplier shown in FIG. 12.

Figure 14:
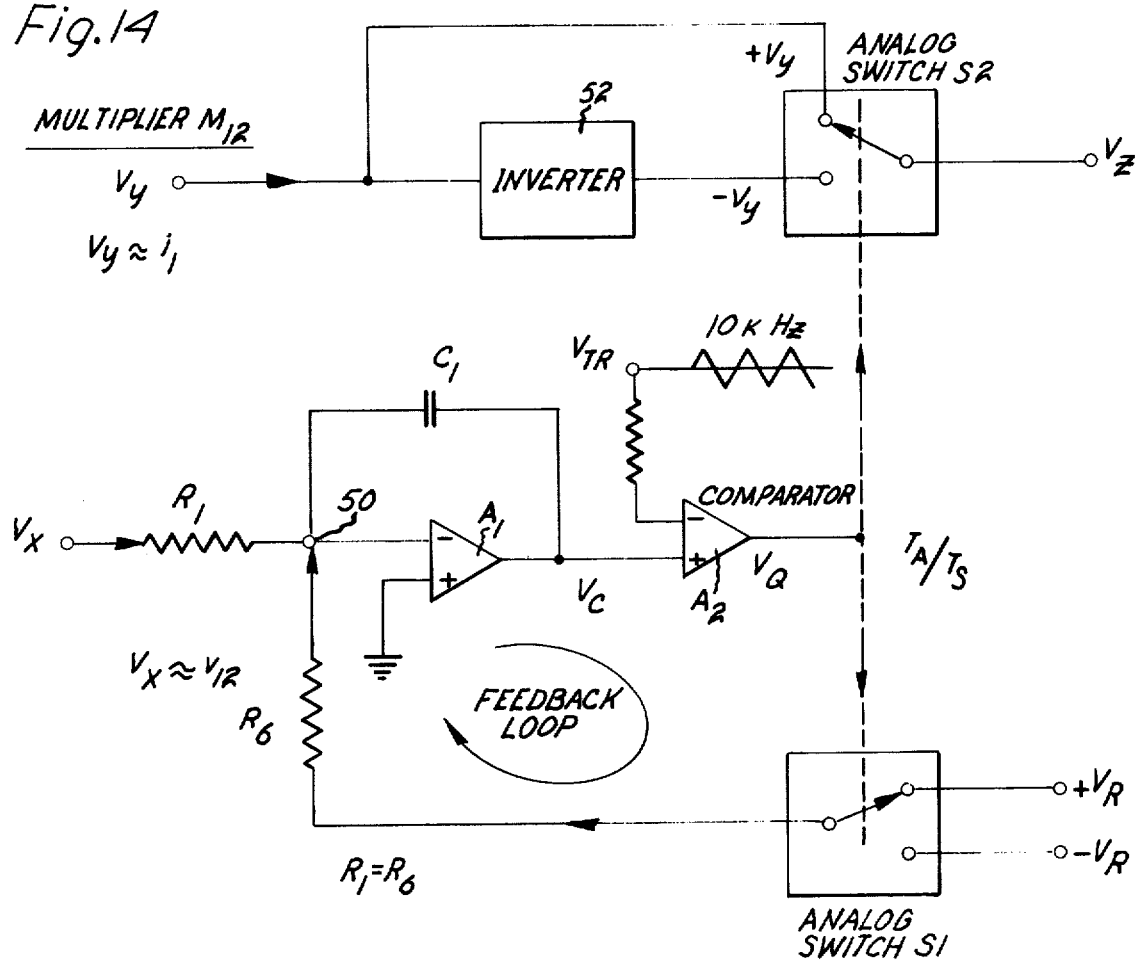

FIG. 14 is another diagram showing in more detail the multiplier network of FIG. 12.

FIG. 15 is a sinusoidal waveform representing a signal voltage $V_X$ delivered to an input of the PWA multiplier network of FIG. 14.

FIG. 16 is a bipolar periodic pulse waveform of a signal voltage $V_Q$ developed at the output of a comparator unit included in the PWA multipliers employed in the meter of the invention.

FIG. 17 is a bipolar periodic pulse waveform of the signal voltage $V_Q$ in its pulse-width-modulated form, after being width modulated.

FIG. 18 shows sinusoidal waveform representations of signal voltages $+V_Y$ and $-V_Y$ in 180° phase displacement.

FIG. 19 shows a waveform of a width-and-amplitude modulated signal voltage $V_Z$ which is delivered at the output of a PWA multiplier; $V_Z$ being proportional to the instantaneous product of the signals $V_X$ and $V_Y$.

Figure 20:
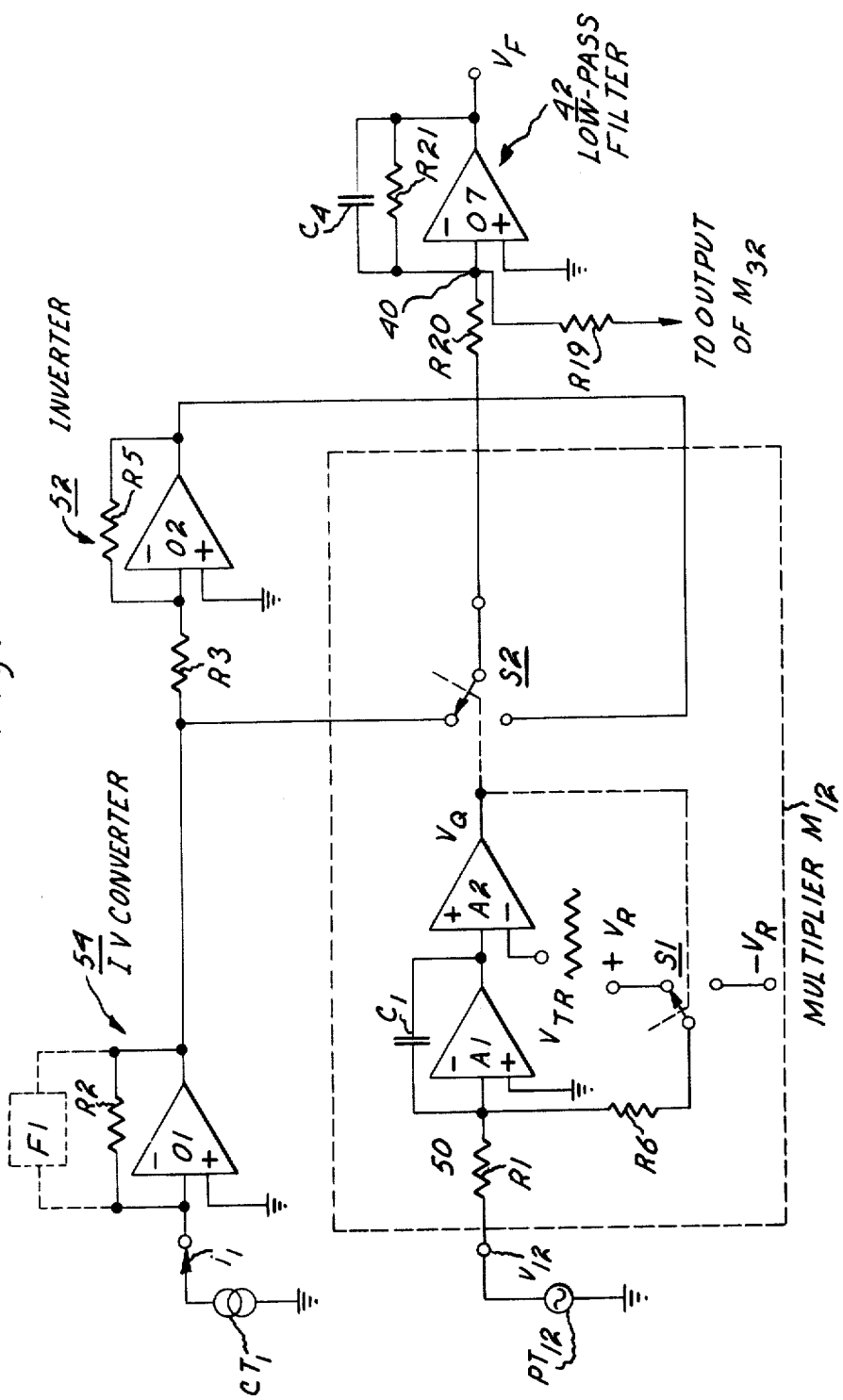

FIG. 20 is a diagram showing, inter alia, the combination of a four-quadrant multiplier, an I/V converter, inverter and LP filter.

Figure 21:
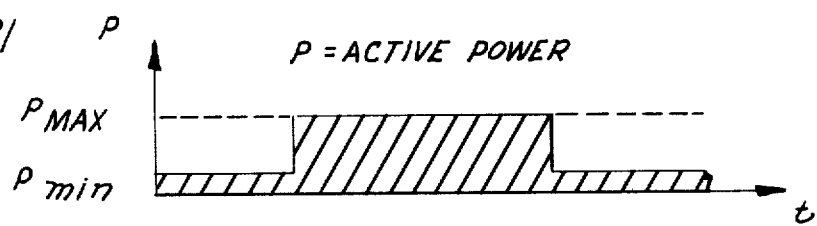

FIG. 21 is a graphical representation showing active system power P as a function of time.

Figure 22:
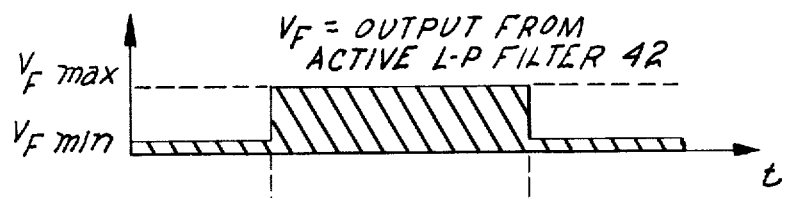

FIG. 22 is a graphical representation showing the variation of the output voltage signal $V_F$ delivered at the output of the aforesaid LP filter.

Figure 23:
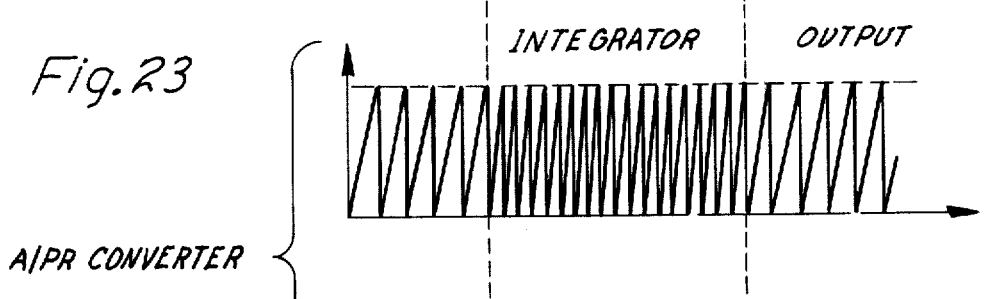

FIG. 23 is a graphical representation showing the sawtooth output signal variation as a function of time in the integrator section of the A/PR converter.

Figure 24:
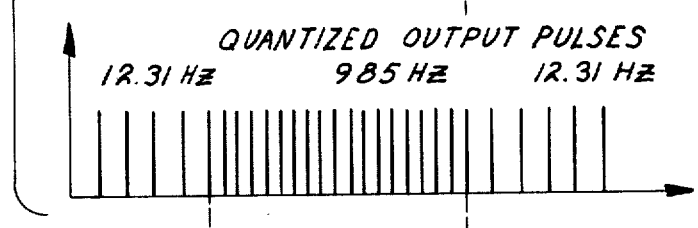

FIG. 24 is a graphical representation showing corresponding quantized output pulses, as a function of time, produced by the A/PR converter.

Figure 25:
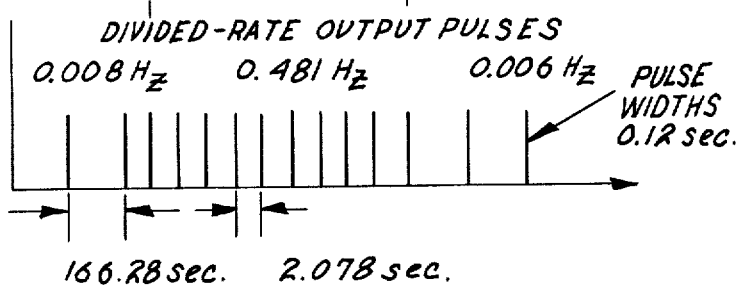

FIG. 25 is another graphical representation showing corresponding output pulses, as a function of time, delivered at a divided frequency rate by the A/PR converter.

FIG. 26 is a graphical representation showing a triangular waveform representing a signal voltage $V_D$ delivered at an integrator section in the A/PR converter.

FIG. 27 is a block diagram of an A/PR converter employed in the meter of the subject invention for providing a trail, or series, of quantized output signal pulses, each representing a predetermined, constant quantity of energy $W_q$.

FIG. 28 is a simplified block diagram of a low cut-off pulse filter unit employed in the subject meter.

Figure 29:
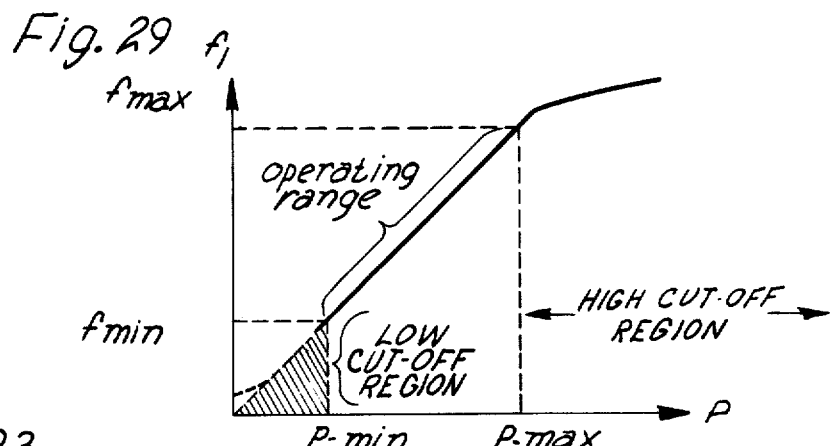

FIG. 29 is a graphical representation showing the pulse, rate, or frequency, of the output pulses delivered by the A/PR as a function of load power P; the minimum and maximum pulse rate and power ranges being indicated.

Figure 30:
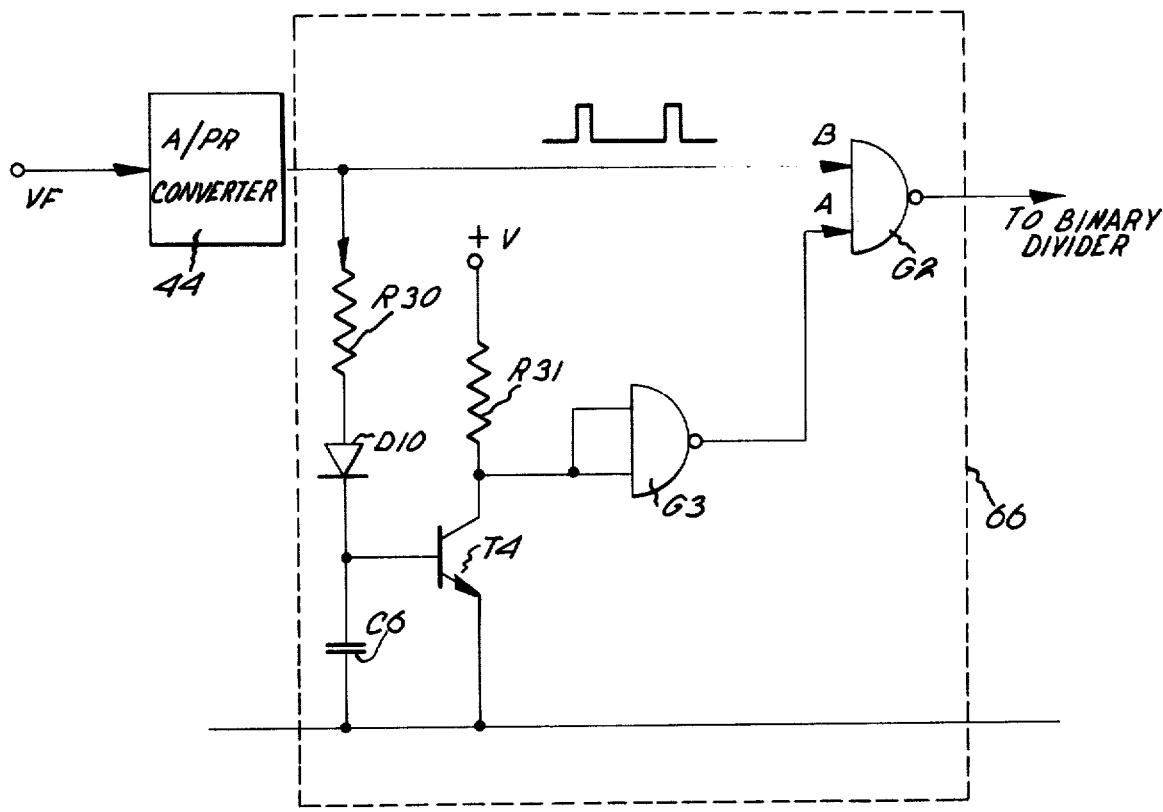

FIG. 30 is a more detailed block diagram, including schematic details, of the low cut-off pulse filter of FIG. 28.

Figure 31:
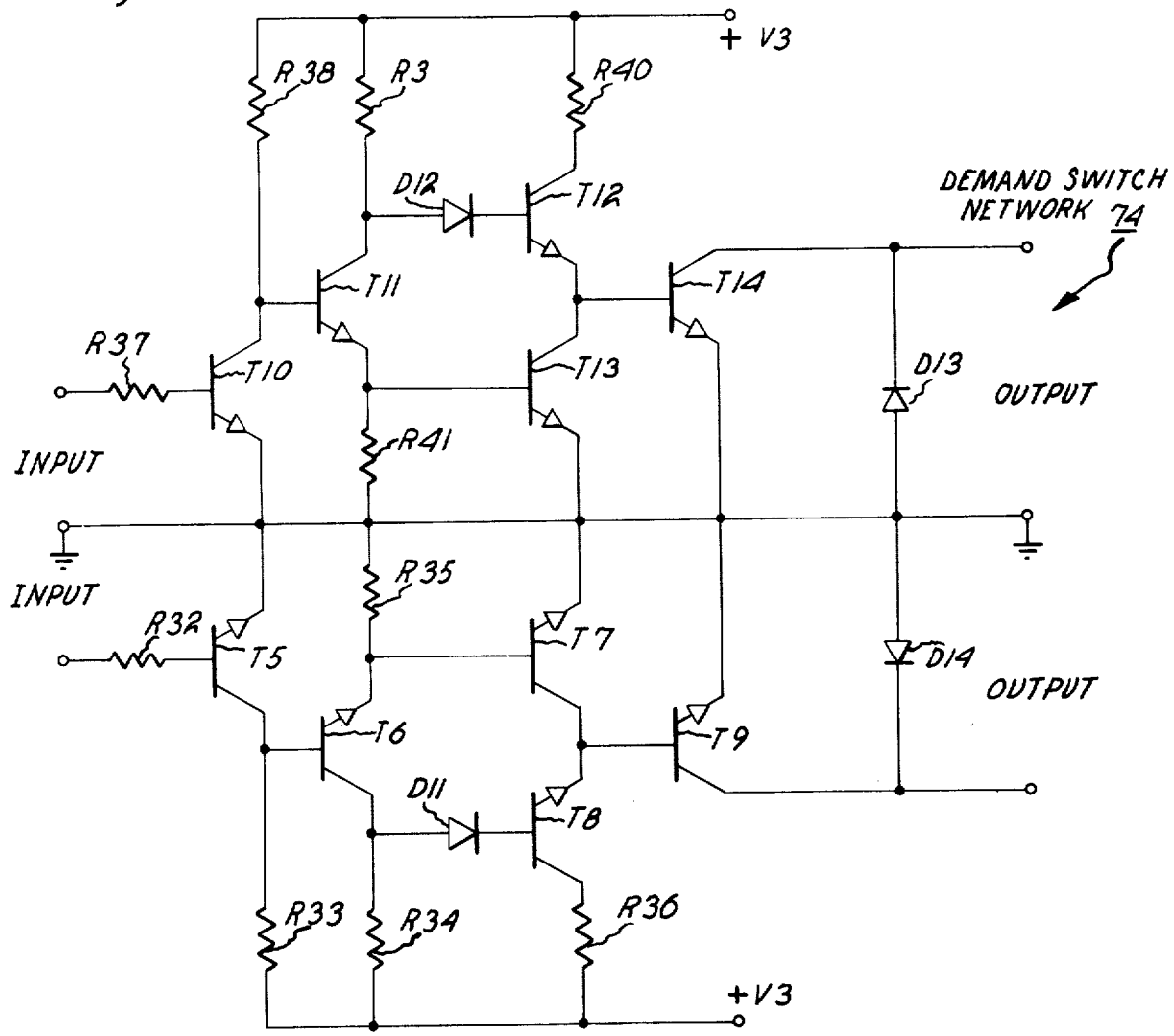

FIG. 31 is a schematic diagram of a solid state demand switch network employed in the energy meter of the subject invention.

Figure 32:
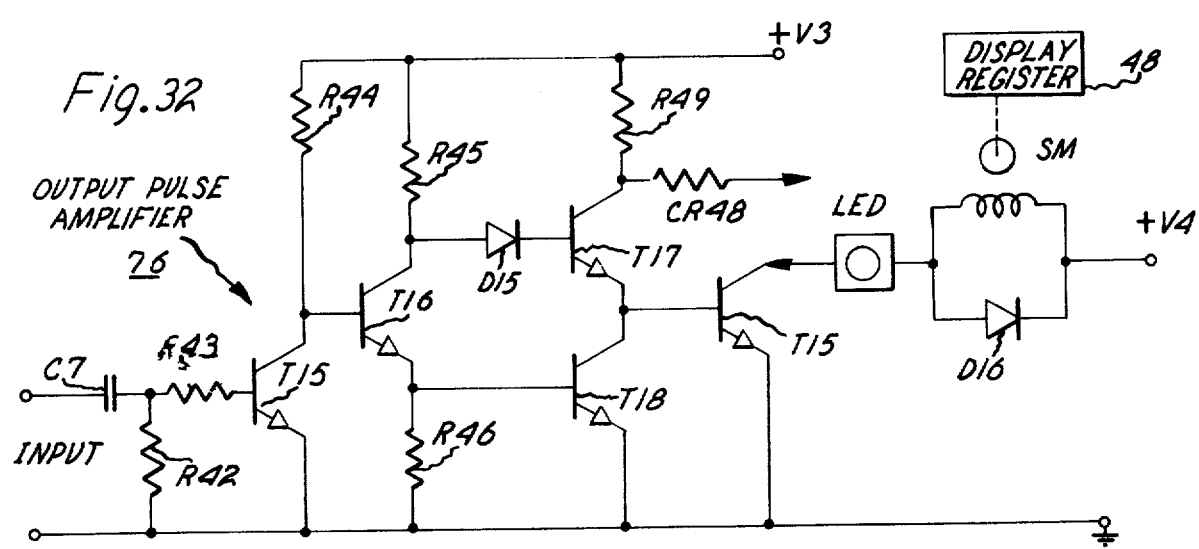

FIG. 32 is another schematic diagram showing, inter alia, a solid state output pulse amplifier unit employed in the meter of the subject invention.

Figure 33:
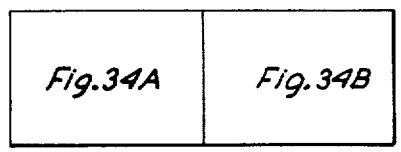

FIG. 33 is a diagram indicating how FIGS. 34A and 34B, hereinafter identified, are to be matched side-by-side to form a complete electrical diagram of the subject metering apparatus according to the invention.

Figure 34A:
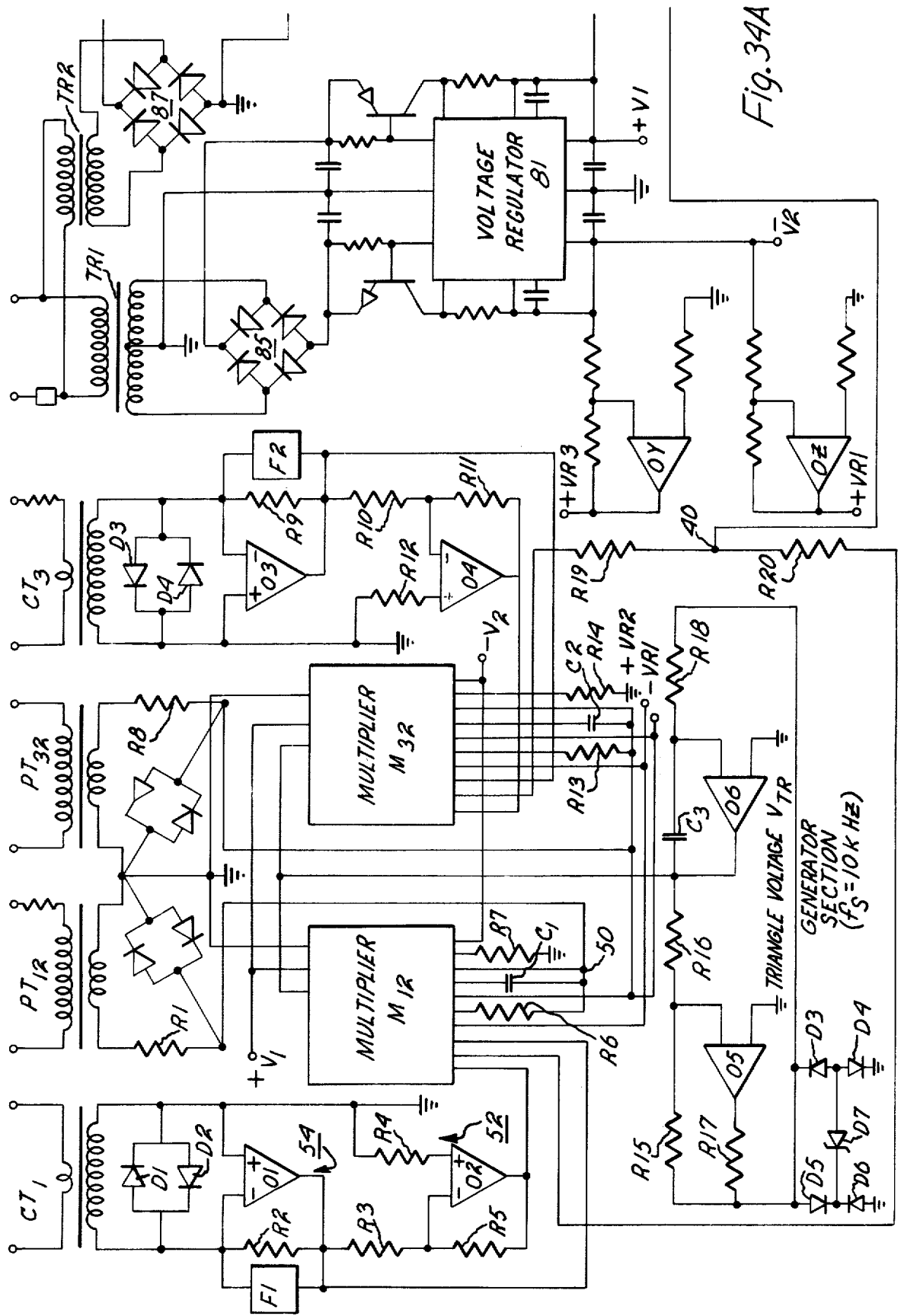
Figure 34B:
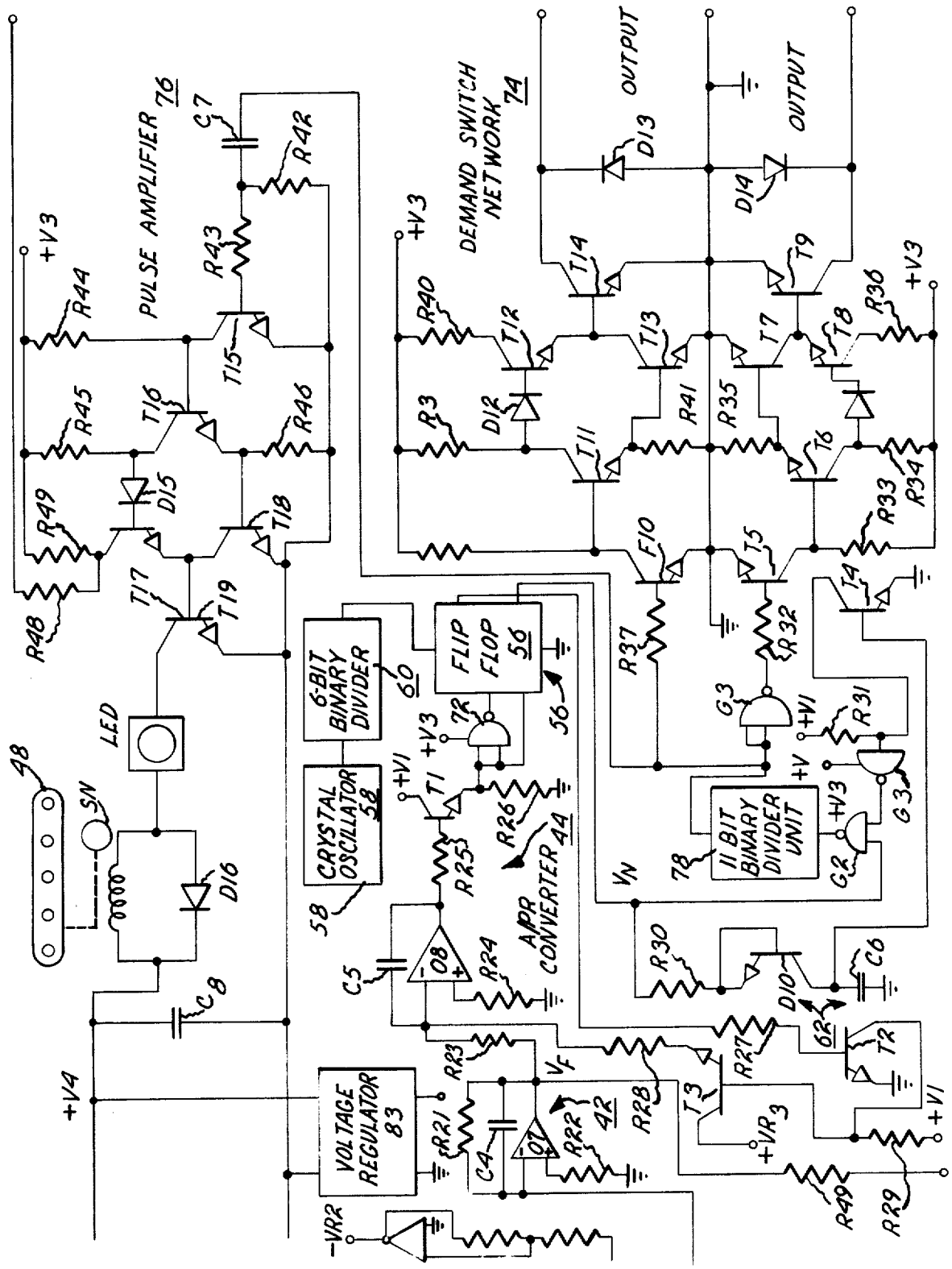

FIGS. 34A and 34B, when matched side-by-side as indicated in FIG. 33, form a complete electrical diagram, of the electrical energy metering apparatus in accordance with one illustrative embodiment of the invention.

Figure 35:
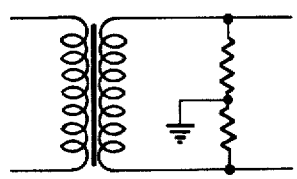

FIG. 35 is a schematic diagram showing an alternative way in which the current transformers may be coupled with the transmission line(s) and the respective multipliers.

DESCRIPTION OF THE ILLUSTRATIVE EMBODIMENT

In the simplified diagram at FIG. 1 the three power lines 1, 2 and 3 of a three-phase, 60 Hz electrical system conduct instantaneous line currents $i_1$, $i_2$ and $i_3$ to a delta-connected polyphase electrical load. Across the three branches of the electrical load three instantaneous line-to-line voltages $v_{12}$, $v_{32}$ and $v_{31}$ are impressed. Two instrument current-transformers $CT_1$ and $CT_3$ as well as two instrument potential-transformers $PT_{12}$ and $PT_{32}$ are electrically coupled with the transmission lines 1, 2 and 3 as shown in FIG. 1. The aforesaid instrument transformers are coupled with the transmission lines according to the teachings of the wellknown Blondel theorem. Thus, line 2 has been arbitrarily selected as the common point, or line, for carrying out power and energy metering in accordance with the aforesaid theorem. The current transformer $CT_1$ provides an output analog signal representative of the instantaneous line current $i_1$. The current transformer $CT_3$ provides an output analog signal representative of the instantaneous line current $i_3$. The potential transformer $PT_{12}$ provides an output analog signal representative of the instantaneous line voltage $v_{12}$. The potential transformer $PT_{32}$ provides an output analog signal representative of the instantaneous line voltage $v_{32}$. The analog signals representing $i_1$ and $v_{12}$ are delivered to the input of a multiplier $M_{12}$. Similarly, the analog signals representing $i_3$ and $v_{32}$ are delivered to the input of another multiplier $M_{32}$. The multiplier $M_{12}$, in effect, multiplies the signals representing $i_1$ and $v_{12}$ and produces at the output of said multiplier a signal $v_{z12}$ which is proportional to the product $p_{12} = i_1 v_{12}$. The multiplier $M_{32}$, in effect, multiplies the signals representing $i_3$ and $v_{32}$ and produces at the output of said multiplier another signal $v_{z32}$ which is proportional to the product $p_{32} = i_3 v_{32}$. As indicated at FIG. 1, the output signals $v_{z12}$ and $v_{z32}$, which represent instantaneous partial powers $p_{12}$ and $p_{32}$, respectively, are summed at a SUMMING POINT 40 to provide another signal representing the total instantaneous system power $p$, where $$p = i_1 v_{12} + i_3 v_{32} \quad \text{(eq. 4.1.5)}$$

The metering principle employed in the illustrative example (FIGS. 1, 34A and 34B) is based on the use of the Blondel theorem which enables power measurement in, for example, a three-phase electrical system, but uses only two multiplying channels. According to the theorem the power in a system of N lines may be measured by (N−1) wattmeter elements so arranged that each of the (N−1) lines contains one current measuring element with a corresponding potential measuring element being connected between each of the lines and a common point. In the event that the common point happens to be one of the lines (e.g., line 2 in FIG. 1) power can be measured by (N−1) elements. Thus, in the three-wire system of FIG. 1 (and FIGS. 34A and 34B) the total instantaneous power $p$ delivered to the load is:

$$p = v_{12}i_{12} + v_{23}i_{23} + v_{31}i_{31} \quad \text{(eq. 4.1.1)}$$

and $v_{31} = v_{32} + v_{21}$ (eq. 4.1.2)

Thus, $p = v_{12}i_{12} + v_{23}i_{23} + v_{32}i_{31} + v_{21}i_{31}$
Also, $p = v_{12}(i_{12} - i_{31}) + v_{32}(i_{31} - i_{23})$. (eq. 4.1.3)
Since, $i_1 = i_{12} + i_{13} = i_{12} - i_{31}$
and $$i_3 = i_{32} + i_{31} = i_{31} - i_{23} \quad \text{(eq. 4.1.4)}$$

the total instantaneous power $p$ from the foregoing equations is equal to:

$$p = i_1 v_{12} + i_3 v_{32} = p_{12} + p_{32} \quad \text{(eq. 4.1.5)}$$

where $v_{12}$ and $v_{32}$ are instantaneous line voltages and $i_1$ and $i_2$ are instantaneous line currents. Also $p_{12}$ and $p_{32}$ are instantaneous partial powers.

In FIG. 1 the signals $v_{z12}$ and $v_{z32}$, representing the aforesaid partial powers $p_{12}$ and $p_{32}$, are combined at the SUMMING POINT 40 and delivered to an input of a summing low-pass filter 42. The filter 42 sums, or integrates, and averages the aforesaid signals representing the partial powers $p_{12}$ and $p_{32}$ to produce at the output of said filter a signal $V_F$ proportional to the active average total system power P. In effect, the filter 42 performs integrating and averaging operations in accordance with the following relationship:

$$P = \frac{1}{T}\int_0^T i_1 v_{12}\, dt + \frac{1}{T}\int_0^T i_3 v_{32}\, dt \quad (\text{eq. } 4.1.6)$$

$$\text{or } P = \frac{1}{T}\int_0^T P_{12}\, dt + \frac{1}{T}\int_0^T P_{32}\, dt$$

$$\text{wherein, } P_{12} = \frac{1}{T}\int_0^T P_{12}\, dt, \text{ and}$$

$$P_{32} = \frac{1}{T}\int_0^T P_{32}\, dt$$

Therefore, $P = P_{12} + P_{32}$ (eq. 4.1.7)
where $P_{12}$ and $P_{32}$ are average partial powers and P is average total power. Also, from the phasor diagram shown in FIG. 2, $$P_{12} = V_{12} I_1 \cos(\psi_{12} + \Theta_1) \quad \text{(eq. 4.1.8)}$$

$$P_{32} = V_{32} I_3 \cos(\psi_{32} - \Theta_3) \quad \text{(eq. 4.1.9)}$$

or:

$P_{12} = V_{12} I_1 (\cos\psi_{12} \cdot \cos\Theta_1 - \sin\psi_{12} \cdot \sin\Theta_1)$ (eq. 4.1.10)

$P_{32} = V_{32} I_3 (\cos\psi_{32} \cdot \cos\Theta_3 + \sin\psi_{32} \cdot \sin\Theta_3)$ (eq. 4.1.11)

where V and I represent the rms values of voltage and current, respectively, $\theta$ is the load impedance phase angle, and $\psi$ is the angle between phase current and line current.

Figure 2:
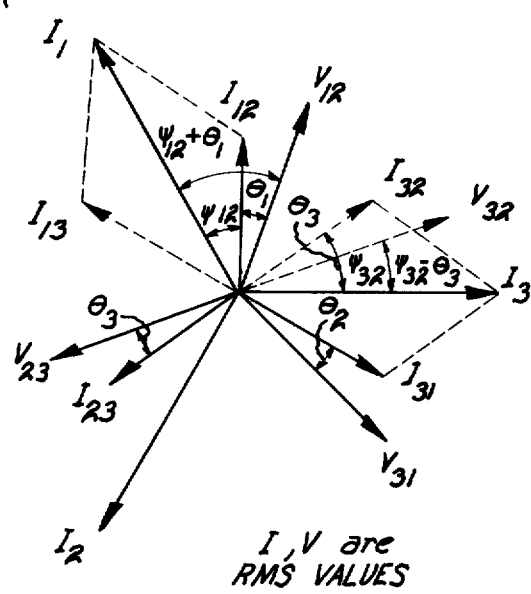
FIG. 2 is a phasor diagram showing various current and voltage phasors, and their relative angular displacements, for the delta-connected load shown at FIG. 3.
Figure 3:
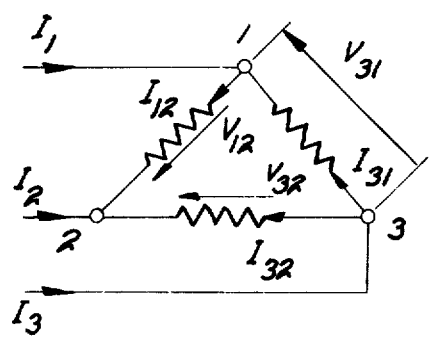
FIG. 3 shows the delta-connected electrical load of FIG. 1 and indicates the various line and phase currents and voltages thereof.

In the case of a balanced load: $\psi_{12} = \psi_{32} = 30°$; $\Theta = \Theta_1 = \Theta_3 = \Theta$; $V_{12} = V$; $I_1 = I_3 = I$ From equations (4.1.10) and 4.1.11) the active, average polyphase power P can be shown to be:

$$P = \sqrt{3}\, V\, I \cos\theta \quad \text{(eq. 4.1.12)}$$

where V represents rms line voltage and I represents rms line current; P representing the true active average power in a polyphase load; and $\theta$ lieing is the phase angle as shown in FIG. 2.

The output signal $V_F$ at the output of the filter 42 is delivered, as indicated at FIG. 1, to the input of an analog to pulse-rate converter 44, or A/PR converter, which functions to convert the signal $V_F$ (which is proportional to P) to system energy W according to the relationship:

$$W = \int_0^T P \, dt$$

However, if the time duration $T = T_q$ (i.e., the indicated integration occurring in the A/PR converter 44 for a finite time duration $T_q$) then each time the energy W accumulates to a quantity $W_q$ in said converter according to the relationship $$W_q = \int_0^{T_q} P \, dt \quad \text{(eq. 4.1.13)}$$

An output signal pulse $V_N$, representing a predetermined quantity of electrical energy $W_q$, is delivered at the output of the A/PR converter 44. For example, in the specific embodiment illustrated each output signal pulse $V_N$ is representative of the quantized electrical energy $W_q = 1.2$ Watt-hours (Wh). Thus, the A/PR converter 44 delivers a series, or train, of pulses $V_N$ at its output; the accumulated number of output pulses $V_N$ representing the total electrical energy W of the system. The aforesaid series of pulses $V_N$ has a variable pulse repetition rate f which is proportional to the total average system power P. As indicated at FIG. 1, the output pulses $V_N$ are delivered to the input of a pulse amplifier 46, the amplified output of which drives a stepping motor SM. The stepping motor SM, in turn, operates an electromechanical kW-hour display register 48 which displays, in decimal digits, the accumulated energy in kilowatt-hours (kW-hours). While a conventional stepping motor SM and electromechanical register 48 are illustrated at FIG. 1, it is to be understood that the stepping motor SM and register 48, are indicated by way of example only. The electrical energy meter according to the present invention may employ, instead of the aforesaid stepping motor and electromechanical register, a liquid crystal or LED display suitably coupled with a non-volatile electronic memory element and driven by logic circuitry.

Referring, again, to the operation of the A/PR converter 44, the average power P in equation (4.1.13) is constant, as shown in the graphical representation at FIG. 9, and $$W_q = PT_q = \text{constant} \quad \text{(eq 4.1.14)}$$

where $W_q$ represents the constant quantized energy of each of the output signal pulses $V_N$ and $W_q$ is designated as the Watt-hour constant. That is, $W_q$ is constant and independent of the product $PT_q \cdot T_q$ is inversely proportional to P due to the operation of the A/PR converter 44 and the output pulse rate f of the A/PR converter 44 is:

$f = 1/T_q = P/W_q = P/\text{Watt-hour constant}$ (eq. 4.1.15)

Hence, the frequency f or output pulse rate of the A/PR converter 44 is proportional to the active average power P in the polyphase load.

The time interval $T_q$, in seconds, between output pulses $V_N$, from equation 4.1.14 is:

$T_q = W_q/3600P$ (seconds) (eq. 4.1.16)

where $T_q$ is in seconds, $W_q$ is in Watt-hours and P is in watts.

Also, the time interval $T_q$ of equation (4.1.14) can be expressed as:

$T_q = K_C/V_F$ (eq. 4.1.17)

where $K_C$ is a conversion factor in volt seconds and $V_F$ is the aforementioned analog input signal delivered to the input of the A/PR converter 44. Also, $V_F$ may be expressed as:

$V_F = K_M P$ (eq. 4.1.18)

where $K_M$ is a multiplication factor of the multipliers in $\text{amp}^{-1}$ and P is the power in watts in the load.

By combining equations (4.1.14), (4.1.17) and (4.1.18) the watt-hour constant $W_q$ becomes:

$W_q = K_C/K_M$ (eq. 4.1.19)

Thus, the watt-hour constant $W_q$ is a quantity determined solely by circuit and system parameters. Therefore, the energy meter provided by the invention is one wherein $K_C$ and $K_M$ depend only on the values of resistors, reference voltages, and transistors $V_{BE}$ ratios, rather than on absolute values of voltage.

Each multiplier $M_{12}$ and $M_{32}$ is a four-quadrant time-division multiplier; i.e., the pulse-width-amplitude, or PWA, type. Such multipliers are known to those in the art. See, for example, the article "A Transistorized Four-Quadrant Time-Division Multiplier with an Accuracy of 0.1 Percent" by Hermann Schmid, IRE Transactions on Electronic Computers, March 1958. See, also, the article "A High-Accuracy Time-Division Multiplier" by Edwin A. Goldberg, RCA Review, September 1952. FIGS. 12 and 13 illustrate the basic operating principle of a PWA multiplier. As shown in FIG. 12, a basic PWA multiplier employs a PULSE-WIDTH MODULATOR and an ANALOG SWITCH. The SWITCH and MODULATOR of FIG. 12 function to multiply the input signal voltages $V_Y V_X$ (which, in the present case, are proportional to an instantaneous line current i and instantaneous line voltage v, respectively) so as to produce an output signal voltage $V_Z$ which is proportional to the product of the input signal voltages $V_Y$ and $V_X$. As is described in more detail hereinafter, with reference to FIGS. 14–20 the incoming analog signal voltage $V_X$ (FIG. 15) is combined with a constant reference voltage $V_R$ (of selectable polarity + or −) at the sampling frequency of $f = 1/T_S$, which sampling frequency is the frequency of the signal voltage $V_{TR}$ having the triangular waveform indicated in FIGS. 12, 14 and 20. In the illustrative embodiment $f_S = 10$ kHz which is very much greater than the line frequency $f_L$ = Hz. As indicated at FIG. 12, the MODULATOR, or PWM, produces an output signal voltage $V_Q$. In effect, the signal $V_X$ (FIG. 15) is converted to the pulse-width-modulated signal $V_Q$ (FIGS. 16 and 17). Subsequently, the signal $V_Q$, shown at FIGS. 16 and 17, drives the ANALOG SWITCH which, in effect, passes, or gates, the incoming signal voltage $V_Y$ (FIG. 18) through said switch for a duration of time $T_A$ proportional to the time ratio $T_A/T_S$ where $T_A/T_S = 1/2 (1 - V_X/V_R)$ (eq. 7.2.1)

In other words, the output signal voltage $V_Z$, illustrated at FIGS. 13 and 19, has a waveform whose amplitude is proportional to the variable signal voltage $V_Y$ (proportional to instantaneous line current i) and whose width ratio or time duration ratio $T_A/T_S$ is proportional to the variable signal voltage $V_X$ (proportional to the instantaneous line voltage v). Where the signal $V_Q$ consists of symmetrical pulses, the ANALOG SWITCH passes, or switches, $V_Y$ and $-V_Y$ (FIG. 18) to the output of said switch such that $V_Z = 0$. If the signal $V_Q$ consists of nonsymmetrical pulses the value of the $V_Z$ is greater than zero. Expressed mathematically, $$V_Z = V_Y (2T_A/T_S - 1) \qquad \text{(eq. 7.2.2)}$$

and, combining equations (7.2.1) and (7.2.2.) results in $$V_Z = -V_X V_Y/V_R \qquad \text{(eq. 7.2.3)}$$

where $R_1 = R_6$ (see FIG. 14)

Thus the average value of $V_Z$ as indicated in FIG. 13 is proportional to the product of $V_X$ and $V_Y$ as well as inversely proportional to $V_R$.

FIG. 14 shows one four-quadrant time-division multiplier $M_{12}$ in more detail. The multiplier $M_{32}$ is similar and it functions in a similar way. The waveforms of FIGS. 15-19 serve to illustrate the operation of the multipliers. In FIG. 14 an analog voltage $V_x$, proportional to the line voltage $v_{12}$, is delivered to a summing point, or node, 50 formed at the junction of two equal-valued resistors R1 and R6. The summing point 50 is connected to the inverting input terminal of an operational amplifier A1, the non-inverting input terminal of the amplifier being connected as indicated to a signal ground or reference point. A capacitor C1 is connected between the summing point 50 and the output terminal of the amplifier A1. The non-inverting input terminal of another operational amplifier A2 is connected to the output terminal of the amplifier A1; the amplifier A2 functioning as a comparator while amplifier A1 and capacitor C1 function as an integrator. A triangular signal $V_{TR}$ having a sampling frequncy $f_S = 10$ kilohertz delivered via a resistance element to the inverting input terminal of the amplifier A2 serves to sample the analog signal $V_X$ (representing $v_{12}$) k times during the period $1/f_L = T_L$. Since $f_S = 10,000$ and $f_L = 60$, $k = f_S/f_L = 167$, approximately. As indicated in FIG. 14 the output terminal of the operational amplifier A2 is coupled with two analog switches S1 and S2. Analog switches S1 and S2 are illustrated as single-pole double-throw switches. However, they are electronic switches which are switched at very high speeds by the signal $V_Q$. The analog switch S1 switches the reference voltages $+V_R$ as well as the reference voltage $-V_R$ to the summing point 50 via the resistance element R6. The analog switch S2 switches the analog signals $+V_Y$ and $-V_Y$. Advantageously, the analog switches S1 and S2 may be comprised of complementary MOS devices. As indicated in FIG. 14 an inverter 52 is provided for the purpose of inverting the $+V_Y$ analog signal to the $-V_Y$ analog signal, as shown at FIG. 18.

The multiplier $M_{12}$ shown at FIG. 14 employs a feedback type up-down integration principle. The triangular signal $V_{TR}$ having the sampling frequency $f_S$, much greater than $f_L$, is delivered to the amplifier A2 (comparator). When the analog signal $V_X$ is zero the output signal $V_Q$ from the amplifier A2 consists of a series of symmetrical pulses, shown at FIG. 16, having a frequency of about 10 kilohertz. This pulse series $V_Q$ drives the analog switch S1 and alternately switches the resistor R6 to $+V_R$ and $-V_R$ reference voltages thereby feeding equal amplitude currents $V_R/R6$ into the summing point 50 during the positive and negative portions of $V_Q$. Thus, capacitor C1 is charged and discharged by the equal amplitude currents so that the average value of $V_C$ at the output terminal of the operational amplifier A1 equals zero. When $V_X$ is greater than zero, the aforesaid balance is changed inasmuch as capacitor C1 is not charged and discharged with equal amplitude currents. Consequently, $V_C$ is no longer equal to zero. Due to the non-symmetry of the charging and discharging currents in C1 and because of the presence of the FEEDBACK LOOP, the signal $V_Q$ no longer consists of symmetrcal pulses required to maintin the summing point 50 at virtually zero potential. Hence, the duty cycle, or time ratio activity $T_A/T_S$, of the output voltage $V_Q$ is defined by the equation (7.2.1) for the condition $R1 = R6$. In effect, the analog signal $V_X$ produces a signal $V_Q$ which is pulse-width modulated. By applying the signal $V_Q$ to control the analog switch S2 there results, in effect, an amplitude modulations. If the signal $V_q$ consists of symmetrical pulses (FIG. 16) the analog switch S2 switches $V_Y$ and $-V_Y$ (FIG. 18) to the output of analog switch S2 such that $V_Z = 0$. If however, $V_Q$ consists of non-symmetrical pulses $V_Z$ becomes greater than zero. Mathematically $V_Z$ may be defined by the equations (7.2.2) and (7.2.3). Accordingly, where $R1 = R6$ and $V_R$ is a constant reference voltage the output voltage $V_Z$ from multiplier $M_{12}$ is directly proportional to the product of $V_X$ and $V_Y$. In FIG. 19, the output signal $V_Z$ is shown as a series of pulses which are both width modulated and amplitude modulated. The FIGS. 15-19 illustrate the situation where the width of the 10 kilohertz ($f_S$) sampling frequency pulses are modulated by the signal $V_X$, which is proportional to the line voltage $v_{12}$, and the amplitude is modulated by the 180° out-of-phase signals $+V_Y$ and $-V_Y$, which are proportional to the line current $i_1$. The output signal $V_Z$ shown in FIG. 19 is proportional to the instantaneous product of $V_X$ and $V_Y$.

With the multiplier shown in FIG. 14, $f_S = 10,000$ and $f_L = 60$ so that $k = f_s/b_L$ and approximately $k = 167$ samplings and multiplications of instantaneous line voltage and line current are accomplished. Inasmuch as the multiplier $M_{32}$ is similar to that of multiplier $M_{12}$ shown in FIG. 14, the multiplier $M_{12}$ samples and multiplies the instantaneous line voltage $v_{32}$ and instantaneous line current $i_3$ approximately k, or 167, times.

Multiplier $M_{12}$ (hereinbefore discussed with reference to FIGS. 14-19) is shown again within the dotted line box in FIG. 20 as being in combination with the inverter 52, and I/V converter 54, $CT_1$, $PT_{12}$ and the low-pass filter 42. The combination of $CT_1$ with converter 54 and inverter 52 is disclosed in the patent application Ser. No. 262,643 hereinbefore identified in more detail. Converter 54 is comprised of operational amplifier 01 which has the feedback resistor R2 and impedence F1 connected therewith as shown. The impedence F1 serves as a phase compensation or phase correction element. See patent applicaiton Ser. No. 346,412 hereinbefore identified in more detail. The secondary winding of the current transformer $CT_1$ is connected across the inverting and non-inverting input terminals of the operational amplifier 01 and in effect is terminated in a virtual short circuit condition. At the output of the operational amplifier 01 there is produced an analog signal voltage which is proportional to the current $i_1$ in the secondary winding of $CT_1$. The aforesaid analog voltage is delivered via resistance R3 to inverter 52 which is a transresistance amplifier comprised of the operational amplifier 02 and the feedback resistance R5.

Although the signal $V_X$, proportional to $v_{12}$, is described hereinbefore (and shown in FIGS. 13 and 14, among other places) as being used to convert $V_Q$ to a pulse-width modulated signal, it is to be understood that the signal $V_Y$, proportional to $i_1$, could be used instead. In other words, in FIG. 13 the signal $V_Z$ could have been amplitude modulated by signal $V_X$ and width modulated by signal $V_Y$, rather than (as shown) amplitude modulated by signal $V_Y$ and width modulated by signal $V_X$. Thus, multiplier $M_{12}$ can be adapted to perform the aforesaid modulations and ultimately perform the required multiplication of $i$, and $v_{12}$. Similarly, the multiplier $M_{32}$ can be adapted to perform similar modulations and ultimately perform the required multiplication of $v_{32}$ and $i_3$.

The multipier $M_{32}$ is similarly combined with an I/V converter and another inverter. Also, the instrument transformers $CT_3$ and $PT_{32}$ are employed in a manner similar to that shown in FIG. 20 for the multiplier $M_{12}$.

The output voltage $V_Q$ from multiplier $M_{12}$ is delivered via resistor R20 to a low pass filter 42. Similarly, another output voltage from the multiplier $M_{32}$ is also delivered via resistor R19 to the low pass filter 42. As shown in FIG. 20 the ends of the resistors R19 and R20 are commonly connected to the inverting input terminal of an operational amplifier 07. The non-inverting input terminal of amplifier 07 is connected to signal ground. As shown in FIG. 20 a capacitor $C_4$ and parallel feedback resistor R21 are connected between the output terminal and inverting input terminal of the operational amplifier 07. The combination of amplifier 07, resistor 21 and capacitor C4 form an active filter. The active filter 42 averages out the DC component from the summed output signals delivered at the summing point 40 delivered thereto from the multipliers $M_{12}$, $M_{32}$. In the embodiment shown in FIG. 20, $R19 = R19$. The values of R19, R20, R21 and C4 are determinative of the corner frequency or cutoff frequency of active filter 42. In the embodiment shown in FIG. 20 and FIGS. 34A and 34B the corner frequency may, for example, be 3.18 hertz. As indicated the output terminal of the operational amplifier 07 produces a voltage signal $V_F$ which is representative of the average power in the whole system. See FIGS. 9, 21 and 22.

The A/PR converter 44 is shown in detail in FIG. 27. The purpose of converter 44 is to convert the DC signal $V_F$ produced by the active filter 42 to a series of quantized pulses, each representing a quantized, or constant amount, of active energy. As shown in FIG. 27 the converter 44 includes an operational amplifier 08 having inverting and non-inverting input terminals as well as an output terminal. The DC signal $V_F$ is coupled via resistor R23 to the non-inverting input terminal of the operational amplifier 08. The non-inverting input terminal is coupled via resistor R24 to signal reference point, or ground. A capacitor $C_5$ is coupled between the inverting input terminal and output terminal of amplifier 08. The output of operational amplifier 08 is coupled to a threshold (delay) flip-flop 56. A fixed-frequency (crystal) reference oscillator 58 and frequency divider unit 60 are also provided, as shown. In addition, a feedback pulse-height reference unit 62 is provided. As indicated, the reference unit 62 is driven by two inputs, a reference voltage $V_{R3}$ and the voltage $V_N$. The reference unit 62 delivers an output current pulse $I_R$ of pulse width or time duration $T_R$ to the inverting input terminal of the operational amplifier 08. See FIG. 27.

FIGS. 21–27 serve to illustrate the operation of the converter 44 shown in FIG. 27. Each pulse in the series of pulses delivered at the output of the converter 44 represents a quantized, predetermined amount of active electrical energy of 1.2 watt-hours, for example. During maximum power in the system, shown at FIG. 21, a quantized pulse representing 1.2 Wh appears at the output of the binary divider unit 78 every 2.078 seconds. Ultimately, each quantized pulse is employed for driving a stepping motor SM. Likewise, at minimum power in the system, a quantized pulse representing the same 1.2 Wh appears at the output of the binary divider unit 78 every 166.28 seconds. In view of the very long time periods involved, the pulse rate converter 44 is comprised of an integrating section (operational amplifier 08 and capacitor $C_5$) and a pulse rate divider section comprising the units 58, 60, 56 and 62. By employing pulse rate division, the capacitor $C_5$ need not be prohibitively large. Thus, by employing pulse rate division, the binary divider unit 78 does provide an output pulse rate of 1/166.28 seconds at the minimum power condition in the polyphase system. See FIGS. 21 and 22.

In FIG. 27 the summing point 64 is at virtually zero potential due to the large open loop gain of operational amplifier 08 and due to feedback action of $C_5$. The input current $I_F$ is a function of the input voltage $V_F$ and resistor R23. When the voltage on capacitor $C_5$ reaches a certain level, the delay flip-flop 56 is switched for a precise time interval $T_R$. During the time interval $T_R$, an analog switch in the feedback pulse height reference unit 62 is activated and causes a current $I_R$ to be produced, discharging $C_5$. Previously as shown in FIG. 26, the capacitor $C_5$ was charged by the input current $I_F$ in accordance with the following relationship $$Q_F(t) = \int_0^{T_F} I_F \, dt \quad (eq. 7.4.1)$$

where $Q_F$ is the charge on capacitor $C_5$.

Similarly, the discharge of the capacitor $C_5$ follows the relationships:

$$Q_R(t) = \int_{T_F}^{T_F + T_R} (I_R - I_F) \, dt \quad (eq. 7.4.2)$$

Since $Q_F(t) = Q_R(t)$
and $$\int_0^{T_F} I_F \, dt = \int_{T_F}^{T_F + T_R} (I_R - I_F) \, dt, \quad (eq. 7.4.3)$$

the pulse rate (or frequency) is, consequently $$f = \frac{1}{T_F + T_R} = \frac{I_F}{I_R T_R} \quad (eq. 7.4.4)$$

Also, $$T_R = T_o K_o, \; I_R = \frac{V_{R3}}{R_{3N}}, \; I_F = \frac{V_F}{R_{23}} \quad (eqs. 7.4.5)$$

The pulse rate from eq. (7.4.4) is consequently $$f = \frac{I_F}{I_R T_R} = \frac{V_F}{R_{23}} \frac{R_{2H}}{V_{R3}} \frac{1}{T_o K_o} = \frac{V_F}{K_A} \quad (eq. 7.4.6)$$

Where,
$K_A$ is the analog conversion factor in volt sec.
$T_o$ is the crystal oscillator period ($T_o = 1/f_o$)
$K_o$ is the oscillator divider factor ($K_o = 64$)
Also, $$K_A = \frac{R_{23}}{R_{2H}} V_{R3} \, T_o K_o \quad (eq. 7.4.7)$$

The output pulse rate in eq. (7.4.6) is directly proportional to the input voltage $V_F$ (or current $I_F$). Because $I_R$ and $T_R$ as well as $R_{2H}$ and $R_{23}$ are constant, an accurate analog conversion is achieved. The time reference $T_R$ is produced by using a crystal-oscillator 58 which oscillates at, for example, 400 kHz. A 6-bit binary divider 60 converts the 400 kHz oscillator frequency down to $f_R = 1/T_R = f_o/64 = 6250$ Hz. $T_R$ is the time reference and determines the down integration time of the A/PR converter 44. The pulse current $I_R$ is determined by a constant reference voltage $V_{R3}$ and value of resistor $R_{3H}$. This current is switched on and off by an accurate analog switch incorporated in the down integration loop of the A/PR-converter. FIGS. 23, 24 and 25 show the output signals occurring in various parts of the A/PR converter 44.

A more detailed description of the A/PR converter 44 of FIG. 27 appears hereinafter with reference to FIGS. 34A and 34B.

In FIG. 28 there is illustrated a simplified block diagram of a low cut-off pulse filter unit 66 employed in conjunction with the converter 44. The low cut-off pulse filter unit 66 is situated within the dotted lines in FIG. 28 and, as shown, is comprised of a pulse-rate-to-voltage converter 68 and a threshold detector and gate unit 70 as well as a NAND gate 72. The details of the low cut-off pulse filter unit 66 are shown in FIG. 30 and the fundamental operation thereof is illustrated graphically in FIG. 29. The purpose of the low cut-off pulse filter unit 66 is to prevent pulses below a preselected minimum pulse rate, representative of a preselected minimum power level, in the load to be passed and ultimately registered in the display register 48. In FIG. 30, pulses from the converter 44 can pass into an 11-bit binary divider unit 78 (see FIGS. 34A, B) only if the gate G3 output is at logical 1 or if the collector of transistor T4 is at approximately zero volts. Such is the case when about 0.6 volt level is accumulated across the integrating capacitor C6 for activating transistor T4. The cut-off frequency of the unit 66 may be adjusted to the required preselected value by varying resistor R30 and C6. At too low a pulse-rate the voltage across C6 is too small to activate transistor T4 and as a result the input of gate G3 is at logical 1 and therefore the output of the gate G3 is at logical 0. Thus, no pulses can pass to the gate G2.

FIGS. 34A and 34B hereinafter discussed shows how the low cut-off pulse filter unit 66 is incorporated with other circuits and networks comprising the electrical energy meter of the invention.

FIG. 31 is a schematic of a solid state demand switch network 74 employed in conjunction with the metering apparatus provided by the invention for the purpose of enabling a demand metering function. That is, transferring quantized pulses from the A/PR converter 44 to a remote station so that signals representative of such pulses may be stored on any demand recorder device, such as a magnetic tape recorder for, inter alia, off-line processing. The network shown in FIG. 31 is in effect a form C-switch. The network 74 is essentially comprised of two three-stage switching amplifying channels. Each time one of the two transistors T14 or T9 is conductive, or on, a capacitor in an external network at the remote metering station is charged rapidly to about 50 volts with transient current of about 200 mA. After the transient time duration interval, the current approaches a steady-state value of about 35 mA. When T14 or T9 switches to the non-conductive, or off condition, the voltage across the output terminals rises to approximately 50 volts. FIGS. 34A and 34B show how the demand switch network 74 is incorporated in the energy meter of the present invention.

FIG. 32 is a schematic diagram showing an output pulse amplifier 76 for driving the stepping motor SM, which in turn actuates display register 48. The pulse amplifier 76 delivers current pulses of about 120mA peak during 150 msec to the stepping motor SM which drives the register 48. The amplifier 76 has, as shown, three amplifying stages and a reverse transient protection diode D16. The pulse amplifier 76 is also shown in FIGS. 34A and 34B.

FIGS. 34A and 34B which are intended to be matched according to the direction indicated in FIG. 33 form a complete electrical diagram of the electrical energy metering apparatus in accordance with one illustrative embodiment of the invention. In operation, current in line 1 and line 3 is measured with the instrument current transformers $CT_1$ and $CT_3$, respectively. Also voltage between line 1 and line 2 is measured by the instrument potential transformer $PT_{12}$. Similarly, the voltage between line 3 and line 2 is measured by the potential transformer $PT_{32}$. The primary windings of both $PT_{12}$ and $PT_{32}$ have series connected resistors $R_S$ therein, as shown in FIG. 34A, for providing phase correction or compensation. The aforesaid current transformers and potential transformers are coupled as shown in FIG. 1 with the power lines 1, 2 and 3 according to the Blondel otheorem, hereinbefore discussed. An I/V converter 54 which is comprised of operational amplifier O1, resistor R2, and phase correction or compensation impedance F1 provides at the output of the operational amplifier O1 a first analog signal voltage of frequency $f_L = 60$ Hz, responsive to and representative of the current measured by $CT_1$ in line 1. As indicated the output terminal of the operational amplifier O1 is directly connected as an input to the multiplier $M_{12}$. Also a 180° phase-inverted first analog signal voltage of frequency $f_L = 60$ Hz is developed by the inverter 52 which is comprised of operational amplifier O2 and feedback resistor R5. The aforesaid inverted first analog signal voltage is developed in response to the analog signal developed at the output terminal of the operational amplifier O1. The inverted output signal voltage from operational amplifier O2 is also delivered as an input to the multiplier $M_{12}$. The converter 54 and inverter 52 are shown and described in FIG. 20, and described hereinbefore, as well as disclosed in the patent applications hereinbefore identified. Oppositely poled diodes D1 and D2 and their purpose are also disclosed in the aforesaid patent applications. Similarly, oppositely poled diodes are used with the potential transformers as shown in FIG. 34A. A second analog signal voltage of frequency $f_L = 60$ Hz is developed by the potential transformer $PT_{12}$ and is representative of the voltage between lines 1 and 2. As indicated one end of the secondary winding of the potential transformer $PT_{12}$ is connected via resistor R1 to the multiplier $M_{12}$. In addition, one end of the resistor R1 is connected to an end of each of the elements, resistor R6 and capacitor $C_1$. A momentary reference to FIG. 20 will show that the resistor R1 is the input resistor coupled to summing point 50 which is at the same potential as the inverting input terminal of the operational amplifier A1 within the multiplier $M_{12}$. The capacitor $C_1$ and resistor R6 which are shown as externally connected to the multiplier $M_{12}$ in FIG. 34A are, nevertheless, part of the multiplier $M_{12}$ as more clearly indicated in FIG. 20. Also connected to the multiplier $M_{12}$ are the various voltage sources, such as $+V_1$, $-V_2$, $+VR_2$, and $-VR_1$.

Also shown in FIGS. 34A and 34B is a triangular voltage, $V_{TR}$, generator section for providing the sampling frequency $f_S$ of, for example, 10 kHz. As indicated, the triangular voltage generating section is comprised of the amplifiers 05 and 06, resistors R15, R16, R17, R18, capacitor $C_3$, and the five diodes D5, D6, D7, D3 and D4. The triangular output voltage $V_{TR}$, of frequency $f_S = 10,000$ Hz, is delivered from the output of the amplifier 06 to the multiplier $M_{12}$.

The current transformer $CT_3$ is instrumental in conjunction with an I/V converter comprising operational amplifier 03 in providing a third analog signal voltage of frequency $f_L = 60$ Hz in response to, and representative of, the current measured in line 3 of the polyphase electrical system. Similarly, an inverter comprising the operational amplifier 04 is instrumental in conjunction with $CT_3$ and the aforementioned I/V converter comprising amplifier 03 in providing a 180° phase-inverted third analog signal representative of the current measured in line 3. The aforesaid third analog voltage signal and inverted third analog signal are, as indicated, delivered to the multiplier $M_{32}$.

Also, a fourth analog signal voltage of frequency $f_l = 60$ Hz is developed by the potential transformer $PT_{32}$ in response to, and representative of, the voltage between line 3 and line 2 of the polyphase electrical system shown in FIG. 1. The aforesaid fourth analog signal voltage is delivered by a resistor R8 to the multiplier $M_{32}$ and to the junction of one end of the elements R13 and $C_2$. The other inputs to the multiplier $M_{32}$ are the voltages $+V_1$, $-V_2$, $+VR_2$, and $-VR_1$. In addition, the triangular voltage $V_{TR}$ at the sampling frequency $f_S = 10$ kHz is also delivered as an input to the multiplier unit $M_{32}$.

Each of the multipliers $M_{12}$ and $M_{32}$ develops therein a signal comprising a series of pulses like that shown in FIG. 16. More particularly, as shown at FIG. 16 there is produced a series of bipolar pulse signals having constant positive and negative signal amplitudes and a pulse rate of frequency $f_s = 10$ kHz, said series having a plurality $k = f_S/f_L$ of such bipolar signals consecutively occupying the time period $T_L = 1/f_L$. This series of bipolar pulse signals are conveniently designated as the first through the kth bipolar pulse signals. In each of the multipliers $M_{12}$ and $M_{32}$, the respective analog voltage signals representing the line-to-line voltages are used for the purpose of pulse-width modulating the aforesaid series of bipolar pulse signals shown at FIG. 16. The result is another series of bipolar pulse signals like that shown in FIG. 17. In FIG. 17 there is shown a modulated signal comprising a series of first through kth consecutive pulse-width-modulated bipolar pulse signals, each having the period $T_S = 1/f_S$. Each pulse width modulated bipolar pulse signal has a positive signal portion with a time duration TA such that the ratio $T_A/T_S$ for each pulse-width-modulated bipolar pulse signal is representative of a corresponding one of a consecutive first through kth sampled amplitudes of, for example, the second analog voltage signal representing the voltage between the lines 1 and 2. The multiplier $M_{32}$ provides such a consecutive series of signals representative of a corresponding one of consecutive first through kth amplitudes of the fourth analog signal representing the voltage between lines 3 and 2. The sampling and production of the consecutive first through kth signals occurs during the time period $T_l = 1/f_L$ as indicated in FIGS. 15 through 17. For the multiplier $M_{12}$, the positive signal portions of each of the consecutive pulse modulated bipolar signals shown at FIG. 17 are employed for gating for the periods of their respective time durations $T_A$, corresponding first through kth consecutive portions of the first analog voltage signal representing current in line 1. Also, the negative signal portions of the consecutive pulse-width-modulated bipolar pulse signals of FIG. 17 are employed for gating for the periods of their respective time durations ($T_S - T_A$) corresponding first through kth consecutive portions of the inverted first analog signal voltage representing the phase inverted line current in line 1 to produce the signal shown at FIG. 19. The multiplier $M_{32}$ performs the same time-division four-quadrant multiplication for analog signals representing the voltage between lines 3 and 2 and the analog signals representing current in line 3 and the 180° phase-inverted analog signal representing the current in line 3. The output from the multiplier $M_{32}$ in a series of pulse-width and amplitude-modulated signals similar to that shown in FIG. 19.

Pulse width and amplitude modulated signals, like those shown in FIG. 19, are delivered to a summing point 40 via the resistors R20 and R19 from multiplier $M_{12}$ and multiplier $M_{32}$. At the summing point 40 the pulse width and amplitude modulated signals from the multipliers are summed so that in each series of first through kth modulated pulses corresponding pulses are added, algebraically. For example, the first pulse in the series delivered by the multiplier $M_{12}$ is algebraically added with the first pulse in the series delivered by the multiplier $M_{32}$ and the second pulse delivered by multiplier $M_{12}$ is added to the second pulse delivered by the multiplier $M_{32}$, etc. At the summing point 40, therefore, there appears a series of pulse width and amplitude modulated consecutive first through kth signals similar in appearance as that shown in FIG. 19, but, in fact, is the summation of the series output of both multipliers, whereby each pulse is representative of the instantaneous power in the whole system. The summing point 40 is directly connected to an input of an operational amplifier 07, which together with capacitor C4 and resistor R21 forms the summing low-pass filter 42.

The summing low pass filter 42, in effect, integrates and averages the pulse width and amplitude modulated series of signals received from the summing point 40. At the summing point 40 the series of pulse width and amplitude modulated signals (similar in waveform to those shown in FIG. 19) represents instantaneous power in the whole system. However, the summing low pass filter 42 at the output thereof produces a voltage $V_F$ which is a DC signal (See FIG. 9) representing the average power in the whole system. As shown, the DC signal $V_F$ is coupled via resistor R23 to an input terminal of the operational amplifier 08 which forms together with capacitor $C_5$, oscillator 58, binary divider 60, flip-flop 56, gate 72 and transistor T1, part of the A/PR converter 44. In addition, the transistors T2 and T3 together with the associated circuit elements shown form the feedback pulse-height reference unit 62 (FIG. 27). The feedback pulse-height reference unit 62 is also part of the A/PR converter 44. The output signal $V_x$ from the flip-flop 56 are delivered as indicated to the low cut-off pulse filter 66 which, as shown in FIGS. 34A and 34B, includes an 11-bit binary divider unit 78 connected to the output of a gate G2. The binary divider unit 78 effectively converts the pulse rate of the signal emanating from the converter 44 to a lower pulse rate. For example, if the pulse rate of the A/PR converter 44 is in the range of 12:31 Hz–985 Hz the binary divider unit 78 converts this pulse rate range to 0.006 Hz–0.481 Hz. This conversion corresponds to the output pulse time intervals 166.28 seconds to 2.078 seconds. Thus, the division factor of the binary divider unit 78 is $K_D = 2048$. By changing $K_D$ from 2048 to 1024 or 4096 the watthour constant $W_q$ of the meter can be converted from 1.2 watthour to 0.6 watthour or 2.4 watthour, respectively. The output pulses from the 11-bit binary divider unit 78 are delivered directly to the input capacitor $C_7$ of the pulse amplifier unit 76. From the pulse amplifier output at transistor $T_{19}$ the quantized pulses are delivered to an LED signal and the field of the stepping motor SM which drives the register 48 and, in effect, accumulates the output pulses. The accumulated or counted pulses represent electrical energy.

Although the binary divider unit 78 converts the pulse rate output of converter 44 to a lower pulse rate for the purpose hereinbefore disclosed, it is to be understood that, if desired, the higher pulse rate (before division by divider unit 78) may be employed for telemetering operations. For example, the output pulses having said higher pulse rate may be transmitted, or telemetered, at the higher pulse rate to a remotely located station.

Also, the binary divider unit 78 can be a non-volatile type of unit so as to provide buffer storage capability in the event of a power failure whereby information therein may be safely stored during the failure period and processed after power has been restored.

Alternatively, the output from the 11-bit binary divider unit 78 is fed via resistor R37 and gate G3 to the demand switch network 74. The demand switch network 74 may be activated by an activating signal or signals from a remote metering station by applying such activating signals to the terminals L, M and N shown. When activated, pulses from the binary divider unit 78 are delivered at these terminals for transmission to the remote metering station.

Regulated voltages for the meter are provided from various outputs from the voltage regulators 81 and 83. These voltage regulators ultimately receive power from the potential transformers TR1 and TR2. Coupled with the transformers TR1 and TR2 are two full-wave bridge rectifiers 85 and 87. The three active elements, operational amplifiers 0x, 0y and 0z, also provide precision voltage regulation.

Although two multipliers $M_{12}$ and $M_{32}$ are employed in the embodiment of FIGS. 34A and 34B because of the advantageous use of Blondel's theorem, it is to be understood that three multipliers (one for each phase) could have been used in combination with three current transformers and three potential transformers.

Also, the metering apparatus of the invention is adaptable for performing totalizing operations. For example, additional polyphase systems having their own multipliers and associated current and potential transformers could be coupled with the metering system shown in FIG. 1 by connecting the outputs of the additional multipliers to summing point 40. In such case, the filter 42, converter 44, amplifier 46, stepping motor SM and display register 48 shown in FIG. 1 would be common to all of the polyphase systems, and energy in all systems would, therefore, be totalized and displayed on register 48.

FIG. 35 shows an alternative way of employing $CT_1$ and $CT_3$. Instead of loading the secondaries of $CT_1$ and $CT_3$ with $O_1$, F1 and $O_2$ and $O_3$, F2 and $O_4$, respectively, the secondaries of $CT_1$ and $CT_3$ may be connected to a center-tapped low ohmic resistance element so that, for example, analog voltages $+V_y$ and $-V_y$, which are 180° out of phase, may be obtained for delivery to multiplier $M_{12}$. A similar arrangement for multiplier $M_{32}$ and $CT_3$ may be made.

The operational amplifiers employed throughout the active electrical energy meter shown in the schematic FIGS. 34A and 34B may be type SSS741B manufactured by Precision Monolithics Incorporated, Santa Clara, Calif.

Although the invention has been described, and illustrated, by way of a specific embodiment and practice thereof, it is to be understood that many changes in the method steps and in details of construction, combination and arrangement of parts and elements, may be made without department from the spirit and scope of the invention which is set forth in the claims hereinafter appearing.

What is claimed is:

1. A method of metering active electrical energy in a polyphase, N line system comprising:
   measuring current in at least (N–1) of said lines and measuring at least (N–1) different line voltages;
   producing a first plurality of at least (N–1) analog signals representing currents measured in the (N–1) lines and producing a second plurality of at least (N–1) analog signals representing the different (N–1) line voltages measured;
   pairing different ones of the current analog signals of the first plurality with different ones of the voltage analog signals of the second plurality such that the different (N–1) pairs are representative of the instantaneous power in different parts of said polyphase system;
   converting each of the (N–1) pairs of analog signals to a different one of an (N–1) series of consecutive signals, each signal in each of the (N–1) series representing instantaneous power in a different part of said system;
   summing all the signals having the same consecutive position in all of the (N–1) series to provide an Nth series of consecutive signals, each representing instantaneous power in the whole system;
   converting said Nth series of signals to a signal representing average power in the whole system;
   converting the average power signal to another series of quantized signals, each representing a constant amount of active electrical energy;
   wherein said polyphase system operates at a frequency $f_L$ hertz and wherein each series of consecutive signals representing instantaneous power in different parts of said system includes consecutive first through kth signals, which signals occur at the constant signal repetition rate $f_S$ and $k = f_S/f_L$ where $f_S < f_L$, wherein each of the first through kth signals is a bipolar pulse having the overall pulse width $T_S = 1/f_S$, each bipolar pulse having positive and negative polarity portions of widths $T_A$ and $(T_S - T_A)$, respectively, the ratio $T_A/T_S$ of each bipolar pulse being representative of instantaneous line voltage and the averaged amplitude of the positive and negative polarity pulse portions taken over the duration $T_S = 1/f_S$ being proportional to the mathematical product of said instantaneous line voltage and said instantaneous line current; and wherein said signal representing average power in the whole system is a variable-amplitude continuous unipolar signal.

2. The method according to claim 1 wherein said system is a three-phase system and said variable-amplitude continuous unipolar signal has an amplitude at any time proportional to average power P in the whole system.

3. A method of metering active electrical energy in a polyphase, N line system comprising:
  measuring current in at least (N-1) of said lines and measuring at least (N-1) different line voltages;
  producing a first plurality of at least (N-1) analog signals representing currents measured in the (N-1) lines and producing a second plurality of at least (N-1) analog signals representing the different (N-1) line voltages measured;
  pairing different ones of the current analog signals of the first plurality with different ones of the voltage analog signals of the second plurality such that the different (N-1) pairs are representative of the instantaneous power in different parts of said polyphase system;
  converting each of the (N-1) pairs of analog signals to a different one of an (N-1) series of consecutive signals, each signal in each of the (N-1) series representing instantaneous power in a different part of said system;
  summing all the signals having the same consecutive position in all of the (N-1) series to provide an Nth series of consecutive signals, each representing instantaneous power in the whole system;
  converting said Nth series of signals to a signal representing average power in the whole system;
  converting the average power signal to another series of quantized signals, each representing a constant amount of active electrical energy;
  wherein said series of quantized signals has a variable signal repetition rate f which is proportional to the average power in the whole system and $f = 1/T_q = P/W_q$ where P is average power in the whole system, $W_q$ is a constant amount of active electrical energy represented by each quantized signal and $T_q$ is the variable time duration between the occurrence of said quantized signals in the series;
  wherein the variable $T_q$ has maximum and minimum values and may have any value between said maximum and minimum values, including said maximum and minimum values, the ratio of maximum to minimum values being a predetermined value independent of $W_q$; and further comprising
  counting only those quantized signals which occur at or between said maximum and minimum values of $T_q$, said maximum and minimum values being preselected.

4. A method of metering active electrical energy in a polyphase, N line system comprising:
  measuring current in at least (N-1) of said lines and measuring at least (N-1) different line voltages;
  producing a first plurality of at least (N-1) analog signals representing currents measured in the (N-1) lines and producing a second plurality of at least (N-1) analog signals representing the different (N-1) line voltages measured;
  pairing different ones of the current analog signals of the first plurality with different ones of the voltage analog signals of the second plurality such that the different (N-1) pairs are representative of the instantaneous power in different parts of said polyphase system;
  converting each of the (N-1) pairs of analog signals to a different one of an (N-1) series of consecutive signals, each signal in each of the (N-1) series representing instantaneous power in a different part of said system;
  summing all the signals having the same consecutive position in all of the (N-1) series to provide an Nth series of consecutive signals, each representing instantaneous power in the whole system;
  converting said Nth series of signals to a signal representing average power in the whole system;
  converting the average power signal to another series of quantized signals, each representing a constant amount of active electrical energy;
  wherein said polyphase system operates at a frequency $f_L$, wherein each (N-1) series of consecutive signals has a constant signal repetition rate $f_S$, wherein said Nth series has the same constant repetition rate $f_S$ and wherein said series of quantized signals has a variable repetition rate $f$;
  wherein $f_S$ is greater than $f_L$ and $f_L$ is greater than $f$; and further comprising
  counting only the quantized signals which occur at or greater than a repetition rate $f = f_{min}$ where $f_{min}$ is a preselected minimum signal repetition rate.

5. Apparatus for metering active electrical energy in a polyphase, N line system comprising:
  means for measuring current in at least (N-1) of said lines;
  means for measuring at least (N-1) different line voltages;
  means coupled with the current measuring means for producing a first plurality of at least (N-1) analog signals representing currents measured in the (N-1) lines;
  means coupled with the voltage measuring means for producing a second plurality of at least (N-1) analog signals representing the different (N-1) line voltages;
  means for pairing different ones of the current analog signals of the first plurality with different ones of the voltage analog signals of the second plurality such that the different (N-1) pairs are representative of the instantaneous power in different parts of said polyphase system;
  means coupled with said pairing means for converting each of the (N-1) pairs of analog signals to a different one of an (N-1) series of consecutive signals, each signal in each of the (N-1) series representing instantaneous power in a different part of said system;
  means coupled with the last mentioned conversion means for summing all the signals having the same consecutive position in all of the (N–1) series for providing an Nth series of consecutive signals, each representing instantaneous power in the whole system;

means coupled with the summing means for converting said Nth series of signals to a signal representing average power in the whole system; and means coupled with said means for converting said Nth series for converting the average power signal to another series of quantized signals, each representing a constant amount of active electrical energy;

wherein each one of the signals representing instantaneous power in a different part of the system is a bipolar pulse having the overall pulse width $T_S$ and consecutive first and second polarity pulse portions having the widths $T_A$ and $(T_S - T_A)$, respectively, the amplitudes of said portions being representative of instantaneous line voltage and the ratio $T_A/T_S$ being representative of instantaneous line current.

6. Apparatus for metering active electrical energy in polyphase, N line system comprising:

means for measuring current in at least (N–1) of said lines;

means for measuring at least (N–1) different line voltages;

means coupled with the current measuring means for producing a first plurality of at least (N–1) analog signals representing currents measured in the (N–1) lines;

means coupled with the voltage measuring means for producing a second plurality of at least (N–1) analog signals representing the different (N–1) line voltages;

means for pairing different ones of the current analog signals of the first plurality with different ones of the voltage analog signals of the second plurality such that the different (N–1) pairs are representative of the instantaneous power in different parts of said polyphase system;

means coupled with said pairing means for converting each of the (N–1) pairs of analog signals to a different one of an (N–1) series of consecutive signals, each signal in each of the (N–1) series representing instantaneous power in a different part of said system;

means coupled with the last mentioned conversion means for summing all the signals having the same consecutive position in all of the (N–1) series for providing an Nth series of consecutive signals, each representing instantaneous power in the whole system;

means coupled with the summing means for converting said Nth series of signals to a signal representing average power in the whole system; and means coupled with said means for converting said Nth series for converting the average power signal to another series of quantized signals, each representing a constant amount of active electrical energy;

wherein said polyphase system operates at a frequency $f_L$ Hertz and wherein each series of consecutive signals represent an instantaneous power in different parts of said system includes consecutive first through kth signals, which signals occur at the constant signal repetition rate $f_S$ and $k = f_S/f_L$ where $f_S$ is greater than $f_L$ and wherein each of the first through kth signals is a bipolar pulse having the overall pulse width $T_S = 1/f_S$, each bipolar pulse having positive and negative polarity portions of widths $T_A$ and $(T_S - T_A)$, respectively, the ratio $T_A/T_S$ of each bipolar pulse being representative of instantaneous line voltage in the averaged amplitude of the positive and negative polarity pulse portions taken over the duration $T_S = 1/f_S$ being proportional to the mathematical product of said instantaneous line voltage and said instantaneous line current; and wherein said signal representing average power in the whole system is in a variable-amplitude continuous unipolar signal.

7. Apparatus according to claim 6 wherein said unipolar signal has an instantaneous amplitude proportional to the average power P in the whole system.

8. Apparatus for metering active electrical energy in a polyphase, N line system comprising:

means for measuring current in at least (N–1) of said lines;

means for measuring at least (N–1) different line voltages;

means coupled with the current measuring means for producing a first plurality of at least (N–1) analog signals representing currents measured in the (N–1) lines;

means coupled with the voltage measuring means for producing a second plurality of at least (N–1) analog signals representing the different (N–1) line voltages;

means for pairing different ones of the current analog signals of the first plurality with different ones of the voltage analog signals of the second plurality such that the different (N–1) pairs are representative of the instantaneous power in different parts of said polyphase system;

means coupled with said pairing means for converting each of the (N–1) pairs of analog signals to a different one of an (N–1) series of consecutive signals, each signal in each of the (N–1) series representing instantaneous power in a different part of said system;

means coupled with the last mentioned conversion means for summing all the signals having the same consecutive position in all of the (N-1) series for providing an Nth series of consecutive signals, each representing instantaneous power in the whole system;

means coupled with the summing means for converting said Nth series of signals to a signal representing average power in the whole system; and means coupled with said means for converting said Nth series for converting the average power signal to another series of quantized signals, each representing a constant amount of active electrical energy;

wherein said series of quantized signals has a variable signal repetition rate f which is proportional to the average power in the whole system and $f = 1/T_q = P/W_q$ where P is average power in the whole system, $W_q$ is a constant amount of active electrical energy represented by each quantized signal and $T_q$ is the variable time duration between the currents of said quantized signals in the series;

wherein the variable $T_q$ has maximum and minimum values and may have any value between said maximum and minimum values, including said maximum and minimum values, the ratio of said maximum to minimum values being a predetermined value independent of $W_q$; and further comprising means for counting only those quantized signals which occur at or between said maximum and minimum values of $T_q$, said maximum and minimum values being preselected.

9. A method of metering active electrical energy in a polyphase, N line, $f_L$ hertz system comprising: measuring current in (N-1) of said lines and measuring (N-1) line voltages in accordance with the method of Blondel's theorem; producing a first plurality of (N-1) analog signals, each representing a different one of said (N-1) measured line currents, and producing a second plurality of (N-1) analog signals, each representing a different one of said (N-1) measured line voltages; pairing, according to the method of Blondel's theorem, a current analog signal selected from said first plurality with a voltage analog signal selected from said second plurality so as to provide (N-1) pairs of analog signals; converting each of the (N-1) pairs of analog signals to a different one of (N-1) series of first through kth consecutive signals, each series having a signal repetition rate $f_S$ greater than $f_L$ and $k = f_s/f_L$, each signal in each of said series representing instantaneous power in a different part of said system; summing all signals of the same ordinal numbers in all of the (N-1) series so as to produce another series of first through kth signals, each representing instantaneous power in the whole system; converting the last-mentioned series of signals to another signal representing average power in the whole system; converging said average power signal to another series of quantized signals, said series having a signal repetition rate f proportional to average power in the whole system, each quantized signal representing a constant amount of active electrical energy.

10. The method according to claim 9 further comprising recording said quantized signals.

11. The method according to claim 9 further comprising counting said quantized signals.

12. The method according to claim 11 wherein the signal repetition rate $f$ of said series of quantized pulses is in the range $f_{min}$ to $f_{max}$ including $f_{min}$ and $f_{max}$, and wherein only the quantized pulses occurring in said range are counted.

13. The method according to claim 9 further comprising dividing said series of quantized pulses of repetition rate f to another series of quantized signals having a repetition rate $1/T_q$, where f is greater than $1/T_q$ and where $T_q$ is the time interval between the quantized signals in said other series.

14. A method of metering active electrical energy in a polyphase, N line, $f_L$ hertz, system comprising: measuring current in (N-1) of said lines and measuring (N-1) line voltages in accordance with Blondel's theorem; producing (N-1) pairs of analog signals, one analog signal in each pair representing a different one of said (N-1) line currents and the other analog signal in each pair representing a different one of said (N-1) line voltages, the analog signals being paired in accordance with Blondel's theorem; converting each pair of analog signals to a different one of (N-1) series of consecutive signals, each series occupying the same time period $1/f_L$ and each signal in each of said series representing instantaneous power in a different part of said system; summing all signals having the same consecutive position in all of the (N-1) series to provide an Nth series of consecutive signals occupying a time period $1/f_L$, each signal in said Nth series representing instantaneous power in the whole system; converting said Nth series of signals to a signal representing average power in the whole system; and, converting said average power signal to another series of quantized signals, each representing a constant amount of active electrical energy.

15. The method according to claim 14 further comprising recording said series of quantized signals.

16. The method according to claim 14 further comprising counting said quantized signals.

17. The method according to claim 16 wherein only those quantized signals occurring at or above a preselected minimum signal repetition rate are counted.

18. A method of metering active electrical energy in a three-phase, three-line $f_L$ hertz system comprising: producing two pairs of analog signals, one pair representing one line current and one line voltage, respectively, the other pair representing another line current and another line voltage, respectively; converting said one pair to one series of first through kth consecutive signals, each signal being representative of instantaneous power in part of the system, said one series having a signal repetition rate $f_S$ such that $f_S > f_L$ and $k = f_S/f_L$; converting said other pair to another series of first through kth consecutive signals, each signal being representative of instantaneous power in the rest of the system, said other series also having the signal repetition rate $f_S$; summing each of said first through kth signals in said one series with a corresponding one of said first through kth signals in said other series so as to produce a third series of first through kth consecutive signals, each being representative of instantaneous power in the whole system; converting said third series of signals to another signal representing average power in the whole system; converting the average power signal to another series of quantized signals, said series having a repetition rate representative of average power in the whole system and each quantized signal representing a constant amount of active electrical energy; and, counting said quantized signals.

19. The method according to claim 18 wherein only those quantized signals occurring at or greater than a predetermined signal repetition rate are counted.

20. The method according to claim 18 wherein said signal representing average power in the whole system is a continuous unipolar signal.

21. The method according to claim 20 wherein said unipolar signal has an instantaneous amplitude proportional to the average power P in the whole system.

22. The method according to claim 18 wherein said one pair and said other pair are grouped in accordance with the Blondel theorem.

23. The method according to claim 18 further comprising recording said quantized signals.

24. The method according to claim 18 wherein each one of the signals representing instananeous power in a different part of the system is a bipolar pulse having an overall pulse width $T_S$ and consecutive first and second polarity pulse portions having widths $T_A$ and ($T_S - T_A$), respectively, the amplitudes of said pulse portions being representative of instantaneous line current and the ratio $T_A/T_S$ being representative of instantaneous line voltage.

25. The method according to claim 18 wherein each one of the signals representing instantaneous power in a different part of the system is a bipolar pulse having the overall pulse width $T_S$ and consecutive first and second polarity pulse portions having width $T_A$ and ($T_S - T_A$), respectively, the amplitudes of said pulse portions being representative of instantaneous line voltage and the ratio $T_A/T_S$ being representative of instantaneous line current.

26. Apparatuus for metering active electrical energy in a polyphase N line, $f_L$ Hertz system comprising: means for measuring current in (N-1) of said lines; means for measuring (N-1) line voltages, said current measuring and voltage measuring means being coupled with said N lines in accordance with Blondel's theorem; means coupled with said current measuring means for producing a first plurality of (N-1) analog signals, each representing a different one of said (N-1) measured line currents; means coupled with said voltage measuring means for producing a second plurality of (N-1) analog signals, each representing a different one of said (N-1) measured line voltages; means for pairing, according to Blondel's theorem, a current analog signal selected from said first plurality with a voltage analog signal selected from said second plurality so as to provide (N-1) pairs of analog signals; means coupled with said pairing means for converting each of the (N-1) pairs of analog signals to a different one of (N-1) series of first through kth consecutive signals, each series having a signal repetition rate $f_S$ greater than $f_L$ and $k = f_S/f_L$, each signal in each of said series representing instantaneous power in a different part of said system; means coupled with said conversion means for summing all signals of the same ordinal numbers in all of the (N-1) series so as to produce another series of first through kth signals, each representing instantaneous power in the whole system; means coupled with said summing means for converting the last mentioned series of signals to another signal representing average power in the whole system; means for converting said average power signal to another series of quantized signals, said series having a signal repetition rate f proportional to average power in the whole system, each quantized signal representing a constant amount of active electrical energy.

27. Apparatus according to claim 26 further comprising means for recording said quantized signals.

28. Apparatus according to claim 26 further comprising means for counting said quantized signals.

29. The apparatus according to claim 28 wherein the signal repetition rate f of said series of quantized signals embraces a preselected range of signal repetition rates and wherein only those quantized signals occurring in said range are counted.

30. The apparatus according to claim 26 further comprising means for dividing the signal repetition rate of said series of quantized signals so as to produce another series of quantized signals having a smaller repetition rate.

31. Apparatus for metering active electrical energy in a three-phase, three-line $f_L$ Hertz system comprising: means for producing two pairs of analog signals, one pair representing one line current and one line voltage, respectively, the other pair representing another line current and another line voltage, respectively; means for converting said one pair to one series of first through kth consecutive signals, each signal being representative of instantaneous power in part of the system, said one series having a signal repetition rate $f_S$ such that $f_S$ is greater than $f_L$ and $k = f_S/f_L$; means for converting said other pair to another series of first through kth consecutive signals, each signal being representative of instantaneous power in the rest of the system, said other series also having a signal repetition rate $f_S$; means coupled with both last mentioned conversion means for summing each of the first through kth signals in said one series with a corresponding one of said first through kth signals in said other series so as to produce a third series of first through kth consecutive signals, each being representative of instantaneous power in the whole system; means coupled with said summing means for converting said third series of signals to another signal representing average power in the whole system; means for converting the average power signal to another series of quantized signals, said series of quantized signals having a repetition rate representative of average power in the whole system and each quantized signal representing a constant amount of active electrical energy; and, means for counting said quantized signals.

32. The apparatus according to claim 31 wherein said counting means counts only those quantized signals occurring at or above a predetermined minimum signal repetition rate.

33. The apparatus according to claim 31 further comprising remotely located means for translating said quantized signals to a remote location; and, means for recording said translated quantized signals.

34. Apparatus, for metering active electrical energy in a three-phase, $f_L$ hertz, electrical system having at least first, second and third lines coupling a three-phase voltage source with a three-phase electrical load, comprising a first current transformer coupled with said first line for producing a first analog signal in response to and representative of current in said first line;

means coupled with said first current transformer for producing an inverted first analog signal, a first potential transformer coupled between the first and second lines for producing a second analog signal in response to and representative of voltage between the first and second lines;

a second current transformer coupled with said third line for producing a third analog signal in response to and representative of current in said third line;

means coupled with said second current transformer for producing an inverted third analog signal;

a second potential transformer coupled between the third and second lines for producing a fourth analog signal in response to and representative of voltage between the third and second lines;

a first four-quadrant time-division multiplier comprising input terminals for receiving said first, inverted first, and second analog signals and an output terminal for delivering a fifth signal comprising a series of bipolar signals having a substantially constant signal repetition rate $f_S$ which is greater than $f_L$, each bipolar signal in said series representing the signed product of the instantaneous current in said first line during a sampling interval $1/f_S$ in the period $1/f_L$ and the instantaneous voltage between said first and second lines during the same sampling interval;

a second four-quadrant time-division multiplier comprising input terminals for receiving said third, inverted third and fourth analog signals and an output terminal for delivering a sixth signal comprising a series of bipolar signals having a substantially constant signal repetition rate $f_S$ which is greater than $f_L$, each bipolar signal in said series representing the signed product of the instantaneous current in said third line during a sampling interval $1/f_S$ in the period $1/f_L$ and the instantaneous voltage between said third and second lines during the same sampling interval;

a low-pass filter comprising an input terminal coupled to the output terminals of the first and second multipliers and an output terminal, said input terminal of said low-pass filter serving as a summing point whereat said first and sixth signals are summed, producing a seventh signal comprising a series of bipolar signals having a substantially constant signal repetition rate $f_S$, each bipolar signal representing the summation, at a sampling interval $1/f_S$ in the period $1/f_L$, of the product of instantaneous current in the first line and instantaneous voltage between the first and second lines and the product of instantaneous current in the third line and instantaneous voltage between the third and second lines, said output terminal of said low-pass filter delivering a unipolar, eighth signal having an amplitude representative of the average amplitude of all the bipolar signals of the series comprising said seventh signal, the amplitude of said eighth signal representing average power in the whole system;

an analog to pulse-rate converter comprising an input terminal and an output terminal, said input terminal being coupled to the output terminal of said low-pass filter, said output terminal delivering a ninth signal comprising a series of quantized unipolar signals of variable signal repetition rate f, each quantized signal representing a constant amount of electrical energy and the rate $f$ representing average power.

35. Apparatus according to claim 34 further comprising means for counting said quantized signals.

36. Apparatus according to claim 35 further comprising means coupled with the counting means for displaying information representative of the number of quantized signals counted.

37. Apparatus according to claim 34 wherein said analog to pulse-rate converter is comprised of an operational amplifier including input and output terminals; a capacitor coupled between said input and output terminals, the input terminal of said operational amplifier being coupled to the output terminal of said low-pass filter, a flip-flop having input and output terminals, the input terminal of said flip-flop being coupled to the output terminal of said operational amplifier; a pulse-height reference unit having an input terminal thereof coupled with the output terminal of said flip-flop and an output terminal of said unit being coupled with the input terminal of said operational amplifier.

38. The apparatus according to claim 37 further comprising a serially connected reference oscillator and frequency divider circuit means coupled with said flip-flop for driving said flip-flop.

39. The apparatus according to claim 38 further comprising a signal rate divider unit coupled with the output of said flip-flop.

40. Apparatus for metering active electrical energy in a polyphase, N line, $f_L$ hertz electrical system comprising:

at least (N−1) current transformers, each coupled with a different one of (N−1) lines for producing an analog signal representing current in the line with which it is coupled;

at least (N−1) potential transformers, each coupled between a different pair of lines among the N lines for producing an analog signal representing the voltage between the pair of lines with which it is coupled;

at least (N−1) four-quadrant time-division multipliers, each adapted for processing one of the analog signals representing current and one of the analog signals representing voltage so as to produce therefrom a series of bipolar signals, each representing instantaneous power in a different part of the electrical system, each bipolar signal having the period $1/f_S$, where $1/f_L$ is greater than $1/f_S$;

summing means coupled with all of the at least (N−1) multipliers for summing all of the at least (N−1) series of bipolar signals and producing an Nth series of bipolar signals, each having the period $1/f_S$ and representing instantaneous power in the whole system; a low-pass filter for processing said Nth series of bipolar signals and producing therefrom a unipolar signal having an amplitude representative of average power in the whole system; means for converting said unipolar signal to a series of quantized signals, each representing a constant amount of energy in the system, said series of quantized signals having a repetition rate f proportional to the amplitude of said unipolar signal; and, means for dividing said series of quantized signals and producing another series of quantized signals having a signal repetition rate smaller than $f$, said dividing means having a non-volatile storage capability.

* * * * *